(12) United States Patent
Kim et al.

(10) Patent No.: US 9,838,696 B2
(45) Date of Patent: *Dec. 5, 2017

(54) VIDEO ENCODING AND DECODING METHOD USING AN INTRA PREDICTION

(71) Applicant: SK TELECOM CO., LTD., Seoul (KR)

(72) Inventors: Hayoon Kim, Seongnam-si (KR); Joohee Moon, Seoul (KR); Yunglyul Lee, Seoul (KR); Haekwang Kim, Seoul (KR); Byeungwoo Jeon, Seongnam-si (KR); Dongwon Kim, Seoul (KR); Mincheol Park, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,915

(22) Filed: Apr. 27, 2017

(65) Prior Publication Data

US 2017/0230670 A1    Aug. 10, 2017

Related U.S. Application Data

(63) Continuation of application No. 14/747,388, filed on Jun. 23, 2015, now Pat. No. 9,674,551, which is a (Continued)

(30) Foreign Application Priority Data

Sep. 8, 2008 (KR) .................. 10-2008-0088088

(51) Int. Cl.
  *H04N 19/61* (2014.01)
  *H04N 19/176* (2014.01)
  (Continued)

(52) U.S. Cl.
  CPC ......... *H04N 19/159* (2014.11); *H04N 19/119* (2014.11); *H04N 19/61* (2014.11);
  (Continued)

(58) Field of Classification Search
  CPC ............................................. H04N 19/00757
  See application file for complete search history.

(56) References Cited

U.S. PATENT DOCUMENTS

2005/0094726 A1   5/2005  Park
2005/0157797 A1*  7/2005  Gaedke ................ H04N 19/105
                                                             375/240.24
(Continued)

OTHER PUBLICATIONS

International Search Report dated Apr. 6, 2010 for PCT/KR2009/004918.

*Primary Examiner* — Kevin McInnish
(74) *Attorney, Agent, or Firm* — Hauptman Ham, LLP

(57) ABSTRACT

A method performed by an apparatus for intra-predicting a current block in the unit of subblocks, comprises: determining an intra prediction mode of the current block among a plurality of intra prediction modes; identifying the subblocks split from the current block; and sequentially reconstructing the identified subblocks using an intra prediction mode identical to the determined intra prediction mode of the current block, wherein a subblock to be reconstructed is predicted using at least one pre-reconstructed neighboring subblock in the current block.

9 Claims, 25 Drawing Sheets

Related U.S. Application Data continuation of application No. 13/001,779, filed as application No. PCT/KR2009/004918 on Sep. 1, 2009, now abandoned.

(51) Int. Cl.
| | | |
|---|---|---|
| *H04N 19/119* | (2014.01) | |
| *H04N 19/159* | (2014.01) | |
| H04N 19/182 | (2014.01) | |
| H04N 19/184 | (2014.01) | |

(52) U.S. Cl.
CPC .......... *H04N 19/176* (2014.11); *H04N 19/182* (2014.11); *H04N 19/184* (2014.11)

(56) References Cited

U.S. PATENT DOCUMENTS

| | | |
|---|---|---|
| 2006/0165304 A1 | 7/2006 | Lee et al. |
| 2007/0025439 A1 | 2/2007 | Han et al. |
| 2007/0047644 A1 | 3/2007 | Lee et al. |
| 2007/0206872 A1 | 9/2007 | Song |
| 2007/0280542 A1* | 12/2007 | Moon .................. H04N 19/176 382/232 |
| 2008/0049834 A1 | 2/2008 | Holcomb et al. |
| 2008/0175317 A1* | 7/2008 | Han ................. H04N 19/00569 375/240.12 |
| 2013/0272417 A1 | 10/2013 | Jeon et al. |

\* cited by examiner

FIG. 3
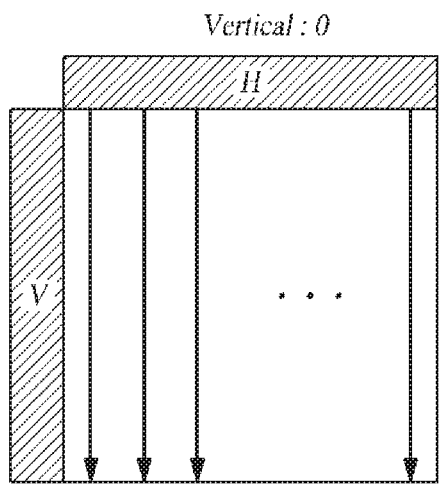
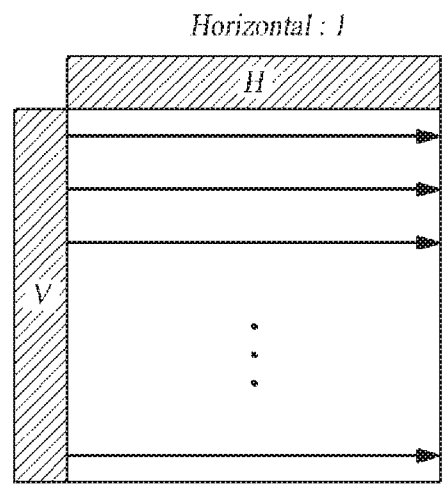
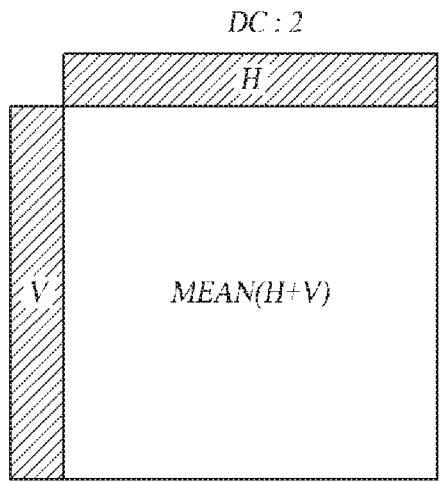
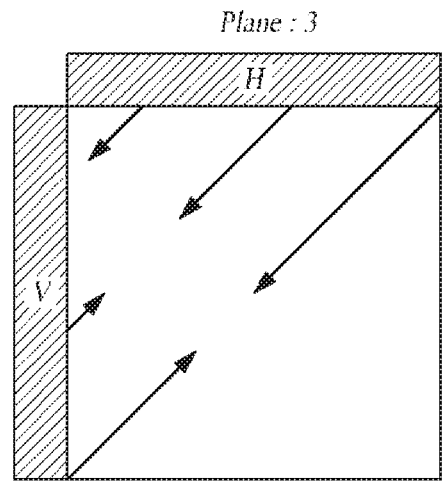

FIG. 4

| 0.5000 | 0.5000 | 0.5000 | 0.5000 |
|---|---|---|---|
| 0.6533 | 0.2706 | −0.2706 | −0.6533 |
| 0.5000 | −0.5000 | −0.5000 | 0.5000 |
| 0.2706 | −0.6533 | 0.6533 | −0.2706 |

BASIC VECTORS FOR
DCT TRANSFORM

FIG. 5

| 0.5000 | 0.6533 | 0.5000 | 0.2706 |
|---|---|---|---|
| 0.5000 | 0.2706 | −0.5000 | −0.6533 |
| 0.5000 | −0.2706 | −0.5000 | 0.6533 |
| 0.5000 | −0.6533 | 0.5000 | −0.2706 |

BASIC VECTORS FOR
DCT INVERSE TRANSFORM

| | | | |
|---|---|---|---|
| 0.0000 | 0.0000 | 0.0000 | 2.0000 |
| 0.6533 | 0.2706 | -0.2706 | -0.6533 |
| 0.5000 | -0.5000 | -0.5000 | 0.5000 |
| 0.2706 | -0.6533 | 0.6533 | -0.2706 |

MODIFIED BASIC VECTORS FOR
DCT TRANSFORM

FIG. 11

| | | | |
|---|---|---|---|
| 0.5000 | 1.3065 | 0.0000 | 0.5412 |
| 0.5000 | 0.9239 | -1.0000 | -0.3827 |
| 0.5000 | 0.3827 | -1.0000 | 0.9239 |
| 0.5000 | 0.0000 | 0.0000 | 0.0000 |

MODIFIED BASIC VECTORS FOR
DCT INVERSE TRANSFORM

Vertical : 0

Horizontal : 1

Plane : 3

FIG. 16
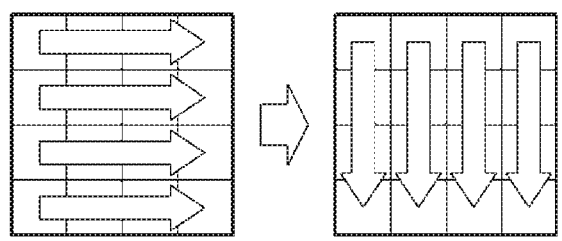
TRANSFORM IN HOR. DIRECTION FIRST
AND THEN VERT. DIRECTION
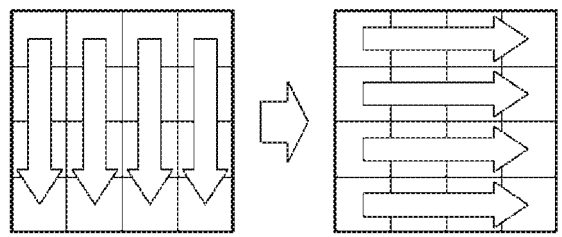
TRANSFORM IN VERT. DIRECTION FIRST
AND THEN HOR. DIRECTION

FIG. 17

FIRST TRANSFORM IN HOR. DIRECTION

2-D FORWARD TRANSFORM

1-D HOR. TRANSFORM     1-D VERT. TRANSFORM

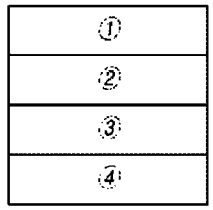     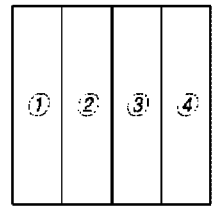

①②③ OF 3 ROWS     ① 1 COL. TO
TO TRANSFORM     TRANSFORM
WITH EXISTING     WITH MODIFIED
BASIC VECTOR     BASIC VECTOR
④ 1 ROW TO     ②③④ OF 3 COLS.
TRANSFORM     TO TRANSFORM
WITH MODIFIED     WITH EXISTING
BASIC VECTOR     BASIC VECTOR

2-D INVERSE TRANSFORM

1-D VERT. INVERSE     1-D HOR. INVERSE
TRANSFORM     TRANSFORM

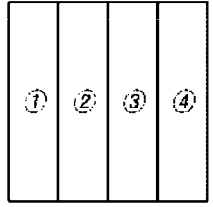     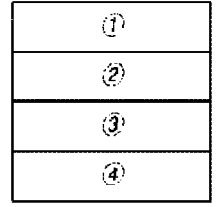

① 1 COL. TO     ①②③ OF 3 ROWS TO
INVERSE     INVERSE
TRANSFORM     TRANSFORM
WITH MODIFIED     WITH EXISTING
BASIC VECTOR     BASIC VECTOR
②③④ OF 3 COLS. TO     ④ 1 ROW TO
INVERSE     INVERSE
TRANSFORM     TRANSFORM
WITH EXISTING     WITH MODIFIED
BASIC VECTOR     BASIC VECTOR

FIG. 18

FIRST TRANSFORM IN VERT. DIRECTION

2-D FORWARD TRANSFORM

1-D VERT. TRANSFORM    1-D HOR. TRANSFORM

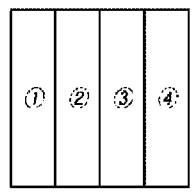 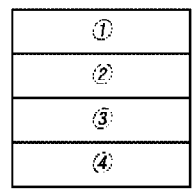

①②③ OF 3 COLS.    ① 1 ROW TO
TO TRANSFORM    TRANSFORM
WITH EXISTING    WITH MODIFIED
BASIC VECTOR    BASIC VECTOR
④ 1 COL. TO    ②③④ OF 3 ROWS
TRANSFORM    TO TRANSFORM
WITH MODIFIED    WITH EXISTING
BASIC VECTOR    BASIC VECTOR

2-D INVERSE TRANSFORM

1-D HOR. INVERSE    1-D VERT. INVERSE
TRANSFORM    TRANSFORM

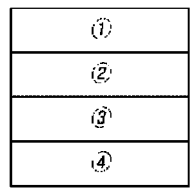 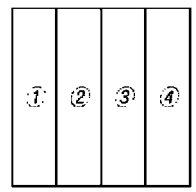

① 1 ROW TO    ①②③ OF 3 COLS. TO
INVERSE    INVERSE
TRANSFORM    TRANSFORM
WITH MODIFIED    WITH EXISTING
BASIC VECTOR    BASIC VECTOR
②③④ OF 3 ROWS TO    ④ 1 COL. TO
INVERSE    INVERSE
TRANSFORM    TRANSFORM
WITH EXISTING    WITH MODIFIED
BASIC VECTOR    BASIC VECTOR

FIG. 26
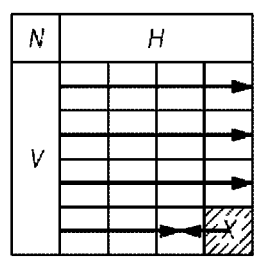
Vertical
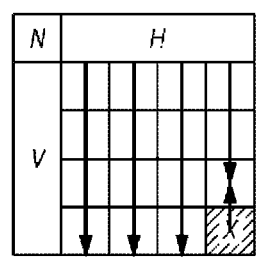
Horizontal
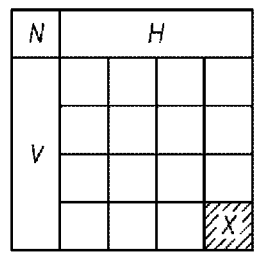
Average(DC)
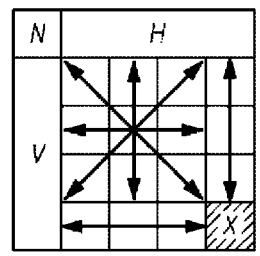
Plane

FIG. 27

| $DC_{00}$ | $AC_{01}$ | $AC_{02}$ | $AC_{03}$ |
|---|---|---|---|
| $AC_{10}$ | $AC_{11}$ | $AC_{12}$ | $AC_{13}$ |
| $AC_{20}$ | $AC_{21}$ | $AC_{22}$ | $AC_{23}$ |
| $AC_{30}$ | $AC_{31}$ | $AC_{32}$ | $AC_{33}$ |

(1) INVERSE QUANTIZED COEFFICIENTS

|  |  |  |  |
|---|---|---|---|
|  |  |  |  |
|  |  |  |  |
|  |  |  | $X_i'$ |

(2) RECONSTRUCTED ARBITRARILY POSITIONED PIXEL $X_i'$

|  |  |  |  |
|---|---|---|---|
|  |  |  |  |
|  | ① | ② | ③ |
| $AC_{30}$ | $AC$① | $AC$② | $AC$③ |

(3) VERTICALLY DCT INVERSE TRANSFORM JUST ①②③ OF 3 COLS.

|  |  |  |  |
|---|---|---|---|
|  |  |  |  |
|  |  |  |  |
| $DC_P$ | $AC$③ | $AC$② | $AC$① |

(4) CALCULATE $DC_P$ FROM $AC$①, $AC$②, $AC$③, AND $X_i'$

FIG. 28

(5) CALCULATE $DC_{00P}$
FROM $AC_{10}$, $AC_{20}$, $AC_{30}$,
AND $DC_P'$ (6) VERTICALLY 1-D DCT
INVERSE TRANSFORM ON
$DC_{00P}$, $AC_{10}$, $AC_{20}$, AND $AC_{30}$ (7) HORIZONTALLY 1-D DCT
INVERSE TRANSFORM (8) RECONSTRUCTED
PIXELS

VIDEO ENCODING AND DECODING METHOD USING AN INTRA PREDICTION

CROSS-REFERENCE TO RELATED APPLICATIONS

This present application is a continuation of U.S. patent application Ser. No. 14/747,388 filed on Jun. 23, 2015, which is a continuation of U.S. patent application Ser. No. 13/001,779 filed on Feb. 4, 2011, which is a the National Phase application of international Application No. PCT/KR2009/004918 filed on Sep. 1, 2009, which is based upon and claims the benefits of priorities from Korean Patent Application No. 10-2008-0088088, filed on Sep. 8, 2008. The disclosures of the above-listed applications are hereby incorporated herein by reference in their entirety.

TECHNICAL FIELD

The present disclosure relates to a video encoding and decoding method using an intra prediction.

BACKGROUND ART

The statements in this section merely provide background information related to the present disclosure and do not constitute prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264. Such H.264/AVC (hereinafter referred to as 'H.264') uses a spatial predictive coding method, which is different from known video coding international standards such as MPEG-1, MPEG-2, MPEG-4 Part2 Visual and the like.

Known video coding methods use "intra prediction" for coefficients transformed in Discrete Cosine Transform Domain (or DCT Transform Domain) to seek higher encoding efficiency resulting in degradation of the subjective video quality at low band transmission bit rates. However, H.264 adopts a method of encoding based on a spatial intra prediction in a spatial domain rather than in a transform domain.

Encoders using an encoding method based on the known spatial intra predictions predict a block to currently encode from information of the previously encoded and reproduced previous blocks, encode information on just the difference of the predicted block from the actual block to encode and, transmit the encoded information to a decoder. At the same time, the encoder transmits parameters needed for prediction of the block to the decoder, or the encoder and decoder are synchronized, so that they share the needed parameters for the decoder to predict the block. At the decoder, prediction of the current block is carried out by using neighboring blocks upon completion of their decoding and then the difference information transmitted from the encoder is added to the predicted current block to reconstruct the target block information to presently decode. Then, again, if the parameters needed for the prediction are transmitted from the encoder, the decoder uses the parameters in predicting the current block.

However, the inventor(s) has noted that when a prediction is performed with respect to the current block according to the typical video encoding/decoding methods, the previously encoded adjacent pixels included in the blocks neighboring (mostly at the left and upper sides of) the block to presently encode, i.e. current block. The inventor(s) has experienced that in this occasion, the current block pixels which are farther from the adjacent pixels in the neighboring blocks are predicted by using the adjacent pixels that have a greater distance and thus the accuracy of prediction is lowered. The inventor(s) has experienced that the less accurate prediction will increase the difference between the actual pixel value and the predicted pixel value, resulting in decreased compression efficiency.

SUMMARY

Some embodiments of the present disclosure provide a method performed by an apparatus for intra-predicting a current block in the unit of subblocks. The method comprises: determining an intra prediction mode of the current block among a plurality of intra prediction modes; identifying the subblocks split from the current block; and sequentially reconstructing the identified subblocks using an intra prediction mode identical to the determined intra prediction mode of the current block, wherein a subblock to be reconstructed is predicted using at least one pre-reconstructed neighboring subblock in the current block.

Herein, the reconstructing of the identified subblocks comprises: predicting the subblock to be reconstructed, by using one or more pixels of the at least one pre-reconstructed neighboring subblock in the current block; generating a residual subblock, by transforming a transform block having frequency coefficients corresponding to the subblock to be reconstructed from a frequency domain into a spatial domain; and adding the predicted subblock to the generated residual subblock.

The generating of the residual subblock comprises: performing one-dimensional transform for each column of the transform block; and performing one-dimensional transform for each row of the transform block of which each column has been one-dimensionally transformed.

BRIEF DESCRIPTION OF DRAWINGS

The drawings described herein are for illustration purposes only and are not intended to limit the scope of the present disclosure in any way.

FIGS. 2 and 3 are exemplary diagrams of intra prediction modes;

FIGS. 4 and 5 are exemplary diagrams of basic vectors for DCT transform and inverse transform, respectively;

FIG. 9 is an exemplary diagram of predictions of an arbitrary pixel block using adjacent pixels to the current macroblock;

FIGS. 10 and 11 are exemplary diagrams of modified basic vectors for forward and inverse DCT transforms, respectively;

FIGS. 12 to 15 are exemplary diagrams of predictions of the remaining pixels in each of sub-blocks;

FIG. 16 is an exemplary diagram of a one-dimensional transform in preparation for a two-dimensional DCT transform;

FIGS. 17 and 18 are exemplary diagrams of an inverse transform procedure using the modified basic vectors according to the sequential directions of the inverse transform;

FIG. 26 is an exemplary diagram of predictions of the respective sub-blocks according to newly decided optimal prediction directions; and FIGS. 27 and 28 are exemplary diagrams of the procedures of using partial frequency coefficients to predict the remaining frequency coefficients according to at least one embodiment of the present disclosure, respectively.

DETAILED DESCRIPTION

Figure 1:
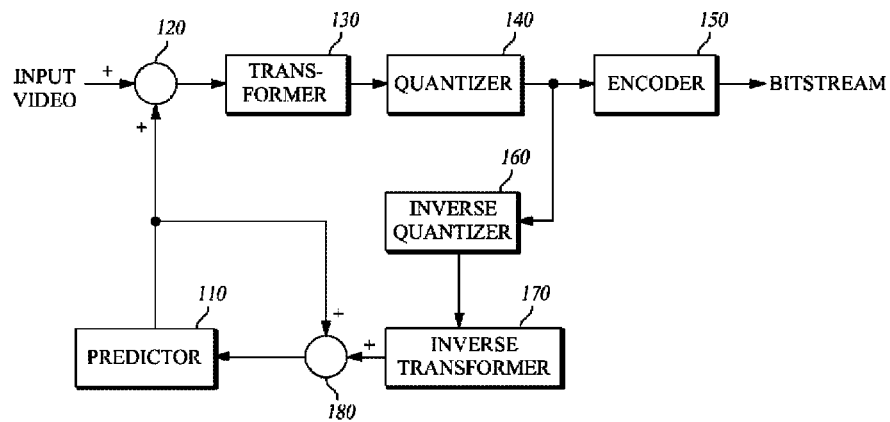
FIG. 1 is a block diagram of a video encoding apparatus according to at least one embodiment of the present disclosure.

Hereinafter, exemplary embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it makes the subject matter of the present disclosure rather unclear. Therefore, the present disclosure has been made in view of the above mentioned problems by improving the prediction accuracy of intra predicting the block to presently encode/decode in order to increase the encoding efficiency.

Also, in describing the components of the present disclosure, there are terms used like first, second, A, B, (a), and (b). These are solely for the purpose of differentiating one component from the other but not to imply or suggest the substances, order or sequence of the components. If a component were described as 'connected', 'coupled', or 'linked' to another component, they mean the components are not only directly 'connected', 'coupled', or 'linked' but also are indirectly 'connected', 'coupled', or 'linked' via a third component.

FIG. 1 is a schematic electronic representation of a video encoding apparatus 100 according to an embodiment of the present disclosure.

Video encoding apparatus 100 comprises a predictor 110, a subtractor 120, a transformer 130, a quantizer 140, an encoder 150, an inverse quantizer 160, an inverse transformer 170, and an adder 180. Other components of the video encoding apparatus 100, such as the predictor 110, the subtractor 120, the transformer 130, the quantizer 140, the encoder 150, the inverse quantizer 160, the inverse transformer 170, and the adder 180 comprise one or more processors and/or application-specific integrated circuits (ASICs) specified for respectively corresponding operation and functions described herein after. The video encoding apparatus 100 further comprises input units (not shown in FIG. 1) such as one or more buttons, a touch screen, a mic and so on, and output units (not shown in FIG. 1) such as a display, an indicator and so on. The video encoding apparatus 100 further comprises communication modem(s) to receive and/or communication signals to thereby communicate with a video decoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

Predictor 110 predicts the current video block that is to be encoded at the present time and generates a predicted block. In other words, predictor 110 predicts the pixel value of each of pixels in current block to encode out of a video according to a predetermined optimal prediction mode to generate a predicted block having a predicted pixel value. Predictor 110 also supplies encoder 150 with prediction mode information, which then is encoded.

Here, the optimal prediction mode refers to the prediction mode determined as having the lowest encoding cost among various intra prediction modes (i.e., respectively nine modes in the intra_8×8 prediction and the intra_4×4 prediction and four modes in the intra_16×16 prediction).

Figure 2:
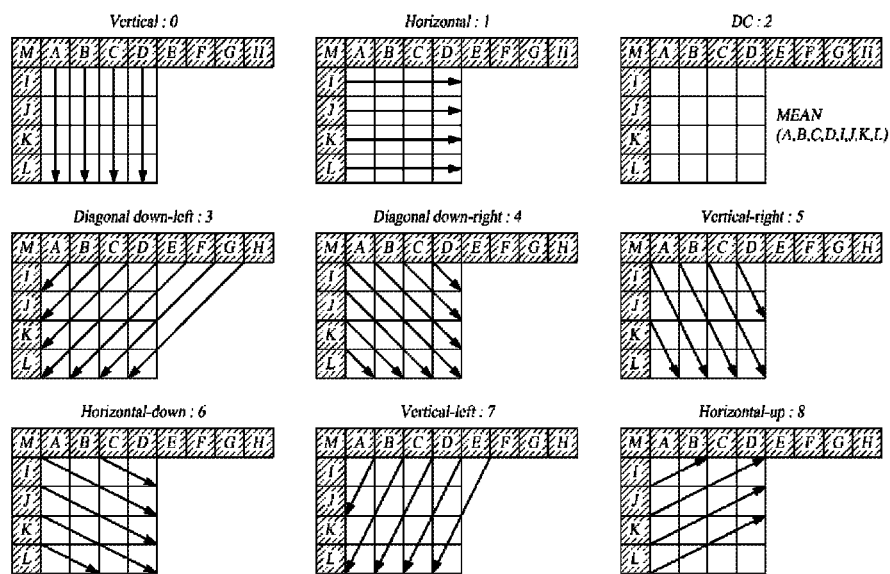

FIGS. 2 and 3 are exemplary diagrams showing intra prediction modes.

Referring to FIG. 2, the intra_4×4 prediction has 9 kinds of prediction modes including a vertical mode, a horizontal mode, a DC (Direct Current) mode, a diagonal down-left mode, a diagonal down-right mode, a vertical-right mode, a horizontal-down mode, a vertical-left mode, and a horizontal-up mode. The intra_8×8 prediction has 9 kinds of prediction modes similar to those of the intra_4×4 prediction. Referring also to FIG. 3, the intra_16×16 prediction has 4 kinds of prediction modes including a vertical mode, a horizontal mode, a DC mode, and a plane mode.

Predictor 110 calculate encoding costs according to either the illustrated nine prediction modes or the four prediction modes depending on the block modes or the block size of the current block and then decide the prediction mode with the lowest cost to encode as the optimal prediction mode.

Subtractor 120 generates a residual block by subtracting the predicted block from the current block. Specifically, subtractor 120 generates a residual block that is a residual signal from the calculated difference between the pixel values of the respective pixels in the current block and the predicted pixel values of the respective pixels in the predicted block at predictor 110.

Transformer 130 transforms the residual block to the frequency domain to effect the transform of the respective pixel values of the residual block into frequency coefficients. Here, the transform of the residual signals into the frequency domain at transformer 130 is through various techniques of transforming video signals on the time axis into the frequency axis such as Hadamard transform, discrete cosine transform (DCT) based transform and others where the residual signal transformed into the frequency domain becomes the frequency coefficient.

FIGS. 4 and 5 are exemplary diagrams showing basic vectors for DCT transform and inverse transform, respectively. For example, transformer 130 uses the basic vectors created according to Equation 1 as shown in FIG. 4 to perform the one-dimensional DCT in the horizontal direction doing the same in the vertical direction to complete a two-dimensional DCT, thereby transforming the pixel value of the spatial domain into the frequency domain. At this time, if the block mode is intra_16×16, the DC values of 16 (4×4) frequency coefficients are exclusively and respectively collected for the 16 sub-blocks in the 4×4 block size and then subject to the Hadamard transform as in Equation 2.

inverse quantizer 160. Specifically, inverse transformer 170 performs the inverse transform with respect to the frequency coefficients of the inverse quantized residual block. Here, inverse transformer 170 uses the reverse of the transform process at transformer 130 in its operation. For example, inverse transformer 170 gathers the DC values of frequency coefficients to perform an inverse Hadamard transform as in Equation 3, and use the basic vectors shown in FIG. 5 to carry out a one-dimensional inverse DCT on the current block vertically and doing the same horizontally, thereby inverse transforming the frequency coefficient of the frequency domain into the spatial domain pixel value.

Equation 1

$$T_{dct(i,j)} = C_i \cos\frac{(2j+1)i\pi}{2N}, C_i = \begin{cases} \sqrt{\frac{1}{N}}, i=0 \\ \sqrt{\frac{2}{N}}, \text{otherwise} \end{cases}$$

$$T_{dct} = \begin{bmatrix} \frac{1}{2} & \frac{1}{2} & \frac{1}{2} & \frac{1}{2} \\ \sqrt{\frac{1}{2}}\cos(\frac{\pi}{8}) & \sqrt{\frac{1}{2}}\cos(\frac{3\pi}{8}) & -\sqrt{\frac{1}{2}}\cos(\frac{3\pi}{8}) & -\sqrt{\frac{1}{2}}\cos(\frac{\pi}{8}) \\ \frac{1}{2} & -\frac{1}{2} & -\frac{1}{2} & \frac{1}{2} \\ \sqrt{\frac{1}{2}}\cos(\frac{3\pi}{8}) & -\sqrt{\frac{1}{2}}\cos(\frac{\pi}{8}) & \sqrt{\frac{1}{2}}\cos(\frac{\pi}{8}) & -\sqrt{\frac{1}{2}}\cos(\frac{3\pi}{8}) \end{bmatrix}$$

Forward

Equation 2

$$Y_D = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix}[W_D] = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Quantizer 140 performs a quantization with respect to the residual block containing the residual signal, which has been transformed into the frequency domain by transformer 130. Here, quantizer 140 uses various quantizing techniques such as a dead zone uniform threshold quantization (DZUTQ), quantization weighted matrix, their improvements, or others.

Encoder 150 encodes the transformed and quantized residual block by using the entropy coding technique to generate a bitstream. In the process, encoder 150 employs various methods for scanning the quantized frequency coefficients of the quantized residual block to generate a quantized frequency coefficient sequence, which is then encoded through the technique such as an entropy encoding for generating a bitstream output. At the same time, encoder 150 encodes information on the prediction mode in which the current block was predicted at predictor 110.

Inverse quantizer 160 performs inverse quantization with respect to the quantized residual block from quantizer 140. Specifically, inverse quantizer 160 performs inverse quantization with respect to the quantized frequency coefficients of the quantized residual block and generates the residual block having the frequency coefficient.

Inverse transformer 170 performs an inverse transform with respective to the inverse quantized residual block from Inverse Equation 3

$$W_{QD} = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix}[Z_D] = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Adder 180 adds the reconstructed residual block from inverse transformer 170 to the predicted block at predictor 110 to reconstruct the current block. The reconstructed current block is stored in predictor 110 as a reference picture for use in encoding the next block to the current block or in a future encoding of another block.

Although not shown in FIG. 1, between predictor 110 and adder 180, a deblocking filter (not shown) is additionally connected. The deblocking filter performs the deblocking filtering on the reconstructed current block received from adder 180. Here, the deblocking filtering refers to the operation for reducing blocking artifact stemming from encoding the video block-by-block and it can be implemented through applying a deblocking filter at the block boundary and macroblock boundary, applying the deblocking filter or saving the use thereof at only the macroblock boundary.

Figure 6:
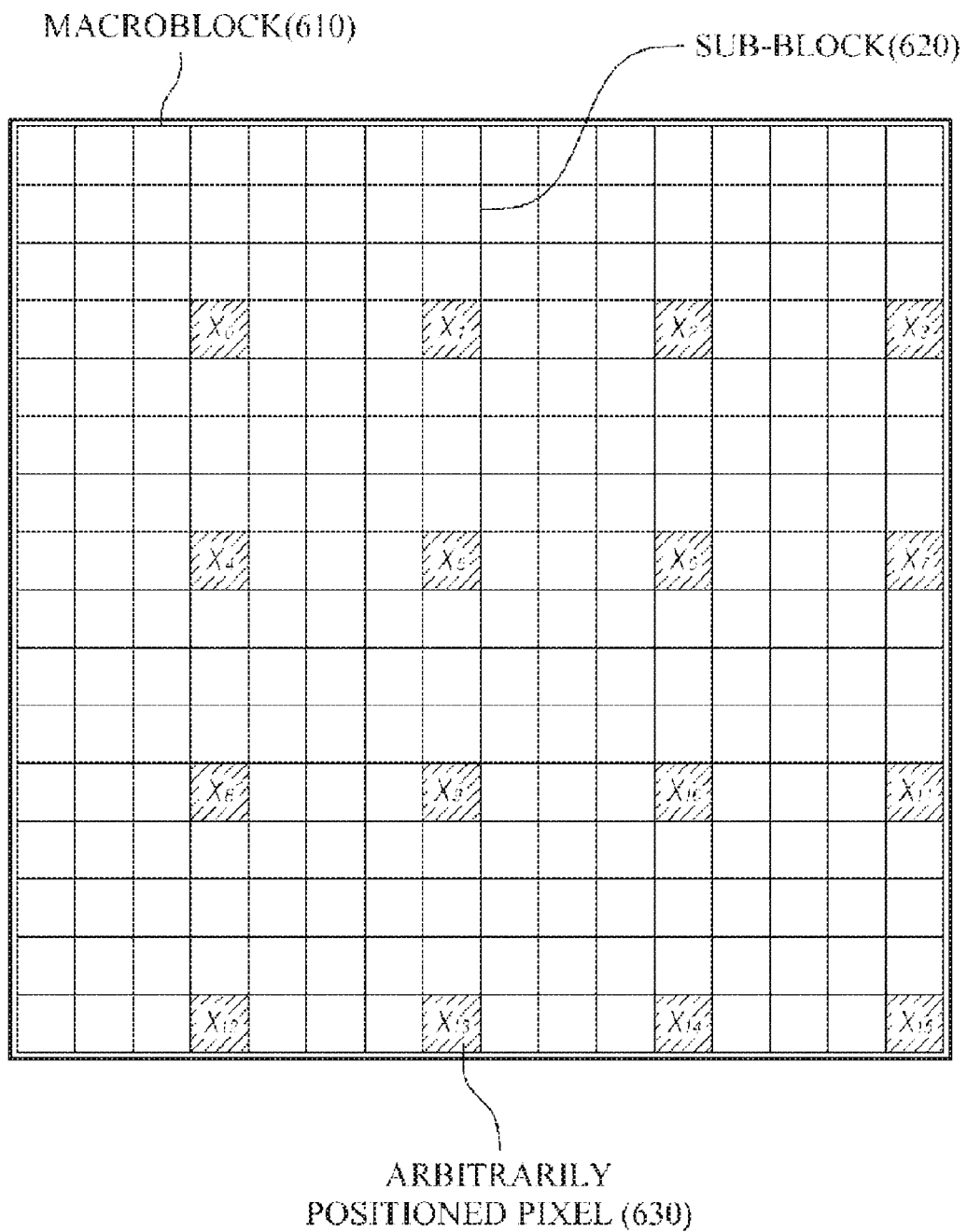
FIG. 6 is an exemplary diagram of arbitrary pixels in a sub-block according to at least one embodiment of the present disclosure.

FIG. 6 is an exemplary diagram showing arbitrary pixels in a sub-block according to an embodiment.

When encoding a macroblock of an arbitrary size, the present disclosure performs the encoding by unit of sub-blocks of arbitrary sizes through first predicting, encoding, and decoding an arbitrary pixel having an arbitrary location in the sub-block to have the arbitrary pixel reconstructed for being then used to predict the remaining pixels in the sub-block so that the entire pixels in the macroblock are predicted starting from the closest pixels rather than remote pixels to prevent a decrease of the prediction accuracy.

Here, the arbitrarily sized macroblock 610 is designated in size by a user as N×M, and the arbitrary size of the sub-block 620 in the arbitrarily sized macroblock 610 is designated by the user to be O×P (where O≤N, P≤M).

In FIG. 6, the arbitrarily sized macroblock 610 to be currently encoded is a 16×16 block having the sub-blocks 620 that are 4×4 blocks shown as compared to the arbitrary pixels 630. In the following embodiment, the disclosure will be described through the exemplary illustrations. Additionally, for the sake of description, the arbitrary pixels in the present disclosure are determined to be located at the bottom right end 630 in the sub-blocks and called $X_i$. However, such a macroblock size, sub-block size, and arbitrary pixel position are parts of exemplary variables, which are implemented into diverse block sizes and pixels at different locations.

Figure 7:
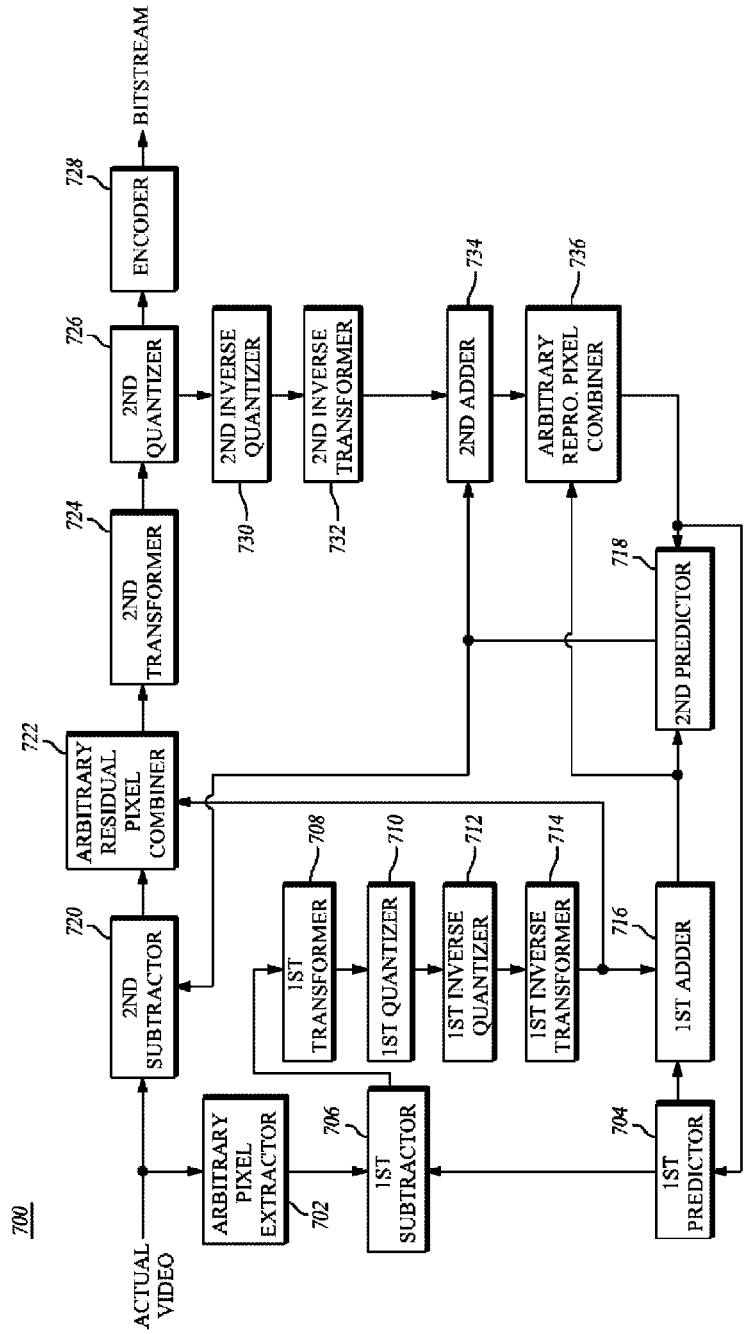
FIG. 7 is a block diagram of a video encoding apparatus according to at least one embodiment of the present disclosure.

FIG. 7 is a block diagram of a video encoding apparatus 700 in an electronic configuration according to an embodiment of the present disclosure.

In order to encode videos, video encoding apparatus 700 comprises an arbitrary pixel extractor 702, a first predictor 704, a first subtractor 706, a first transformer 708, a first quantizer 710, a first inverse quantizer 712, a first inverse transformer 714, a first adder 716, a second predictor 718, a second subtractor 720, a combiner 722 for combining arbitrary residual pixels, a second transformer 724, a second quantizer 726, an encoder 728, a second inverse quantizer 730, a second inverse transformer 732, a second adder 734, and a combiner 736 for combining reconstructed arbitrary pixels. Other components of the video encoding apparatus 700, such as the arbitrary pixel extractor 702, the first predictor 704, the first subtractor 706, the first transformer 708, the first quantizer 710, the first inverse quantizer 712, the first inverse transformer 714, the first adder 716, the second predictor 718, the second subtractor 720, the combiner 722, the second transformer 724, the second quantizer 726, the encoder 728, the second inverse quantizer 730, the second inverse transformer 732, the second adder 734, and the combiner 736 comprise one or more processors and/or application-specific integrated circuits (ASICs) specified for respectively corresponding operation and functions described herein after. The video encoding apparatus 700 further comprises input units (not shown in FIG. 7) such as one or more buttons, a touch screen, a mic and so on, and output units (not shown in FIG. 7) such as a display, an indicator and so on. The video encoding apparatus 700 further comprises communication modem(s) to receive and/or communication signals to thereby communicate with a video decoding apparatus through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

Video encoding apparatus 700 is embodied by, for example, a personal computer or PC, notebook or laptop computer, personal digital assistant or PDA, portable multimedia player or PMP, PlayStation Portable or PSP, or mobile communication terminal or such devices. Video encoding apparatus 700 represents a variety of apparatuses equipped with, for example, a communication system such as a modem for carrying out communications between various devices or wired/wireless communication networks, a non-transitory memory medium for storing various programs for encoding videos and related data, and a microprocessor for executing the programs to effect operations and controls.

Figure 8:
FIG. 8 is an exemplary diagram of an extraction of an arbitrary pixel block from a current macroblock according to at least one embodiment of the present disclosure.

Arbitrary pixel extractor 702 extracts arbitrary pixels from each of sub-blocks of a current block of the video and generate an arbitrary pixel block. Arbitrary pixel extractor 702 extracts the arbitrary pixels 630 $X_0 \sim X_{15}$ at arbitrary positions among the pixels in the respective sub-blocks 620 of the current macroblock 610 as illustrated in FIG. 6 and generate the arbitrary pixel block shown in FIG. 8. FIG. 8 is an exemplary diagram showing an operation of extracting an arbitrary pixel block from a current macroblock.

First predictor 704 predicts the arbitrary pixel block and generates a predicted arbitrary pixel block. First predictor 704 utilizes pixels $V_i$ ($V_0 \sim V_{15}$) and pixels $H_i$ ($H_0 \sim H_{15}$), which are close to the current macroblock among pixels at its left and upper sides and encoded prior to the encoding of the current macroblock, as a means of adjacent pixels for predicting the arbitrary pixel block, and generates the predicted arbitrary pixel block having predicted arbitrary pixels from predictions of each of the arbitrary pixels in the arbitrary pixel block.

Figure 9:
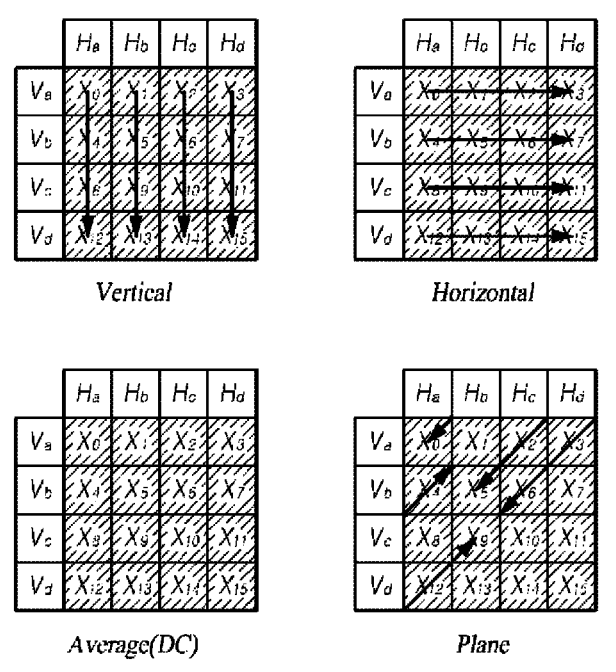

In addition, first predictor 704 performs a low-pass filtering on the adjacent pixels to the current macroblock and predicts the arbitrary pixel block using down-sampled pixels. FIG. 9 is an exemplary diagram for showing predictions of the arbitrary pixel block using adjacent pixels to the current macroblock. Referring to FIG. 9, first predictor 704 performs the low-pass filtering on the selected pixels $V_i$ ($V_0 \sim V_{15}$) adjacent to current macroblock and then the down-sampling on the same to calculate pixels $V_a$, $V_b$, $V_c$, and $V_d$, thereby obtaining the left-side adjacent pixels. Similarly, first predictor 704 performs the low-pass filtering on the selected pixels $H_i$ ($H_0 \sim H_{15}$) adjacent to current macroblock and then the down-sampling on the same to calculate pixels $H_a$, $H_b$, $H_c$, and $H_d$, thereby obtaining the upper-side adjacent pixels.

At this time, first predictor 704 predicts the arbitrary pixel block in the same direction as the prediction direction according to the prediction mode of the current macroblock. Here, the prediction direction of the current macroblock is that of the intra_16×16 prediction as shown in FIG. 3, and it can be the optimal prediction mode determined as having the lowest cost to encode among the respective prediction modes as information on such a prediction mode is supplied to encoder 728.

First subtractor 706 subtracts the predicted arbitrary pixel block from the arbitrary pixel block and generates an arbitrary pixel residual block. Specifically, first subtractor 706 generates the arbitrary pixel residual block that is residual signals equal to the differences between the respective predicted arbitrary pixel block pixel values and the respective arbitrary pixel block pixel values.

First transformer 708 transforms the arbitrary pixel residual block. First transformer transforms each arbitrary residual signal in the arbitrary pixel residual block into the frequency domain to generate the frequency coefficients for the arbitrary residual pixels. In addition, first transformer 708 transforms exclusively and independently the respective residual signals in the arbitrary pixel residual block. For this purpose, first transformer 708 performs the DCT transform with respect to the arbitrary residual signals in the arbitrary pixel block to independently transform the respective arbitrary pixel residual blocks only.

Furthermore, first transformer 708 carries out the Hadamard transform after the DCT transform performed. For example, if the current macroblock is an intra_16×16 block, first transformer 708 does the Hadamard transform over the DCT transformed frequency coefficients, but it does not add the Hadamard transform if the current macroblock is an intra_4×4 block. This is because the current macroblock determined to be the intra_4×4 block has little correlation between images and the Hadamard transform would rather decrease the efficiency of the process.

First quantizer 710 performs a quantization with respect to the transformed arbitrary pixel residual block. First quantizer performs quantization with respect to the frequency coefficients of the arbitrary pixel residual block to have the arbitrary pixel residual block generated with the quantized frequency coefficients.

First inverse quantizer 710 performs an inverse quantization with respect to the quantized arbitrary pixel residual block. First inverse quantizer 710 performs the inverse quantization with respect to the quantized frequency coefficients of the arbitrary pixel residual block to have the arbitrary pixel residual block generated with the inverse quantized frequency coefficients.

First inverse transformer 714 performs an inverse transform with respect to the inverse quantized arbitrary pixel residual block. First inverse transformer 714 transforms the frequency coefficients of the arbitrary pixel residual block into the spatial domain to have a reconstructed arbitrary pixel residual block generated with reconstructed arbitrary residual signals. At this time, first inverse transformer 714 performs the inverse transform with respect to the respective arbitrary pixel residual signals exclusively and independently by performing an inverse DCT transform with respect to the frequency coefficients from the transform of the respective arbitrary pixel residual signals by using modified basic vectors for the inverse DCT transform. In addition, first inverse transformer 714 performs the inverse DCT transform over the inverse Hadamard transform of the frequency coefficients from the transform of the respective arbitrary pixel residual signals.

Here, the modified basic vectors for the forward and inverse DCT transform mean such basic vectors modified from the forward and inverse DCT transformed basic vectors shown in FIGS. 4 and 5 in order to perform the forward and inverse transforms on the arbitrary pixels independently of the remaining pixels in the respective sub-blocks and they are determined as shown in FIGS. 10 and 11. FIGS. 10 and 11 are exemplary diagrams showing the forward and inverse DCT transforming modified basic vectors, respectively. That is to say, first transformer 708 and first inverse transformer 714 use the modified vectors in FIGS. 10 and 11 in order to allow the forward and inverse transforms on the arbitrary residual signals $Xd_i$ exclusively and independently when second transformer 724 and second inverse transformer 732 perform forward and inverse transforms on the remaining pixels in the sub-blocks.

For example, when using the modified basic vectors of the DCT transform shown in FIG. 10 to perform a one-dimensional transform with respect to four pixels $P_{0-3}$, with the basic vector (0, 0, 0, 2) corresponding to the transformed first frequency coefficient ($Coeff_0$) and directed only to the component of arbitrary residual signal $Xd_i$, the first frequency coefficient is eventually calculated as in Equation 4.

$$Coeff_0 = 0 \times P_0 + 0 \times P_1 + 0 \times P_2 + 2 \times P_3 = 2 \times P_3 \quad \text{Equation 4}$$

Therefore, in the transform, using the modified basic vectors for DCT transform shown in FIG. 10 will give the first frequency coefficient comprised of the single component of pixel $P_3$. Thus, at varying values of the pixels $P_{0-2}$, the first frequency coefficient remains unchanged and thus the arbitrary pixels enter into transforms independently of the remaining pixels $P_{0-2}$.

In order to transform the arbitrary pixel residual signal $Xd_i$, which is the residual signal of the arbitrary pixel extracted from each sub-block in the current macroblock, independently of the remaining pixels in the sub-block, first transformer 708 performs the total of two-dimensional transform with the basic vector (0, 0, 0, 2) corresponding to the transformed first frequency coefficient ($Coeff_0$). As the one-dimensional transform equals to 2 times the value of the arbitrary pixel residual signal $Xd_i$, performing the two-dimensional transform equals to 4 times the value of the arbitrary pixel residual signal $Xd_i$. This is like performing the two-dimensional transform of the respective sub-blocks with the modified basic vectors for DCT transform shown in FIG. 10 first and then gathering just the frequency coefficients located at the top left sides of the respective sub-blocks. Thus, first transformer 708 performs the two-dimensional transform in both the vertical and horizontal directions by multiplying the values of the 16 (4×4) arbitrary pixel residual signal $Xd_i$ values extracted from the respective sub-blocks in the current macroblock by 4, and then perform the Hadamard transform using the equation 2 with respect to the transformed frequency coefficients as with the frequency coefficients of the DC components of the respective sub-blocks in the intra_16×16 block in H.264.

Likewise, the frequency coefficients that correspond to the arbitrary pixel residual signals are inverse transformed independently of the other frequency coefficients ($Coeff_{1-3}$). The corresponding frequency coefficients at the inverse transform are calculated as in Equation 5.

$$P_3' = Coeff_0/2 \quad \text{Equation 5}$$

First adder 716 adds the inverse transformed arbitrary pixel residual block to the predicted arbitrary pixel block to generate a reconstructed arbitrary pixel block.

Second predictor 718 predicts the remaining pixels in the respective sub-blocks by using adjacent pixels to the current macroblock and each of reconstructed arbitrary pixels in the reconstructed arbitrary pixel block to generate predicted blocks. Specifically, when predicting the respective sub-blocks in the current macroblock, second predictor 718 predicts the remaining pixels but the arbitrary pixels of the respective sub-blocks.

FIGS. 12 to 15 are exemplary diagrams showing extractions of the remaining pixels in each of sub-blocks. As shown in FIGS. 12 to 15, second predictor 718 predicts the remaining pixels of the respective sub-blocks by using the respectively reconstructed arbitrary pixels in the reconstructed arbitrary pixel block after encoding and decoding thereof and the adjacent pixels $V_i(V_0 \sim V_{15})$ and $H_i(H_0 \sim H_{15})$ that are adjacent to the current macroblock and inside the macroblocks neighboring the current macroblock. At this juncture, the prediction direction of second predictor 718 is same as that of first predictor 704.

Figure 12:
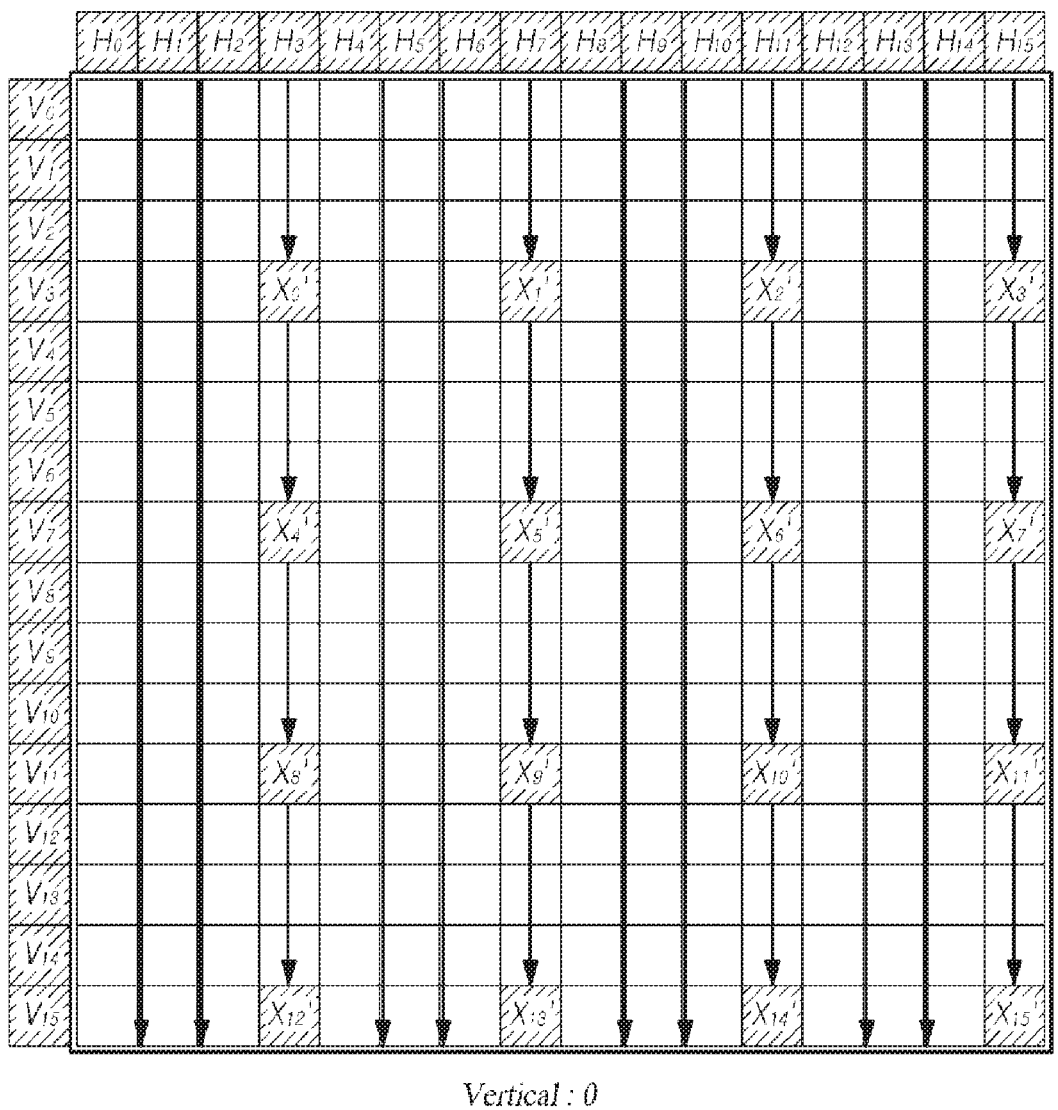

Referring to FIG. 12, at the vertical prediction direction, the remaining pixels located at coordinates (0, 0)~(0, 15) are predicted to be the pixel $H_0$ value, the remaining pixels located at coordinates (1, 0)~(1, 15) to be the pixel $H_1$ value, and the remaining pixels located at coordinates (2, 0)~(2, 15) to be the pixel $H_2$ value. However, among the pixels at coordinates (3, 0)~(3, 15) traversing the reconstructed arbitrary pixels $X_0'$, $X_4'$, $X_8'$, and $X_{12}'$, those pixels within coordinates (3, 0)~(3, 2) are to be predicted as the pixel $H_3$ value while pixels within coordinates (3, 4)~(3, 6) are to be predicted as the reconstructed arbitrary pixel $X_0'$, pixels within coordinates (3, 8)~(3, 6) are to be predicted as the reconstructed arbitrary pixel $X_4'$, and pixels within coordinates (3, 12)~(3, 14) are to be predicted as the reconstructed arbitrary pixel $X_8'$. The remaining columns of the current macroblock can be similarly predicted.

Figure 13:
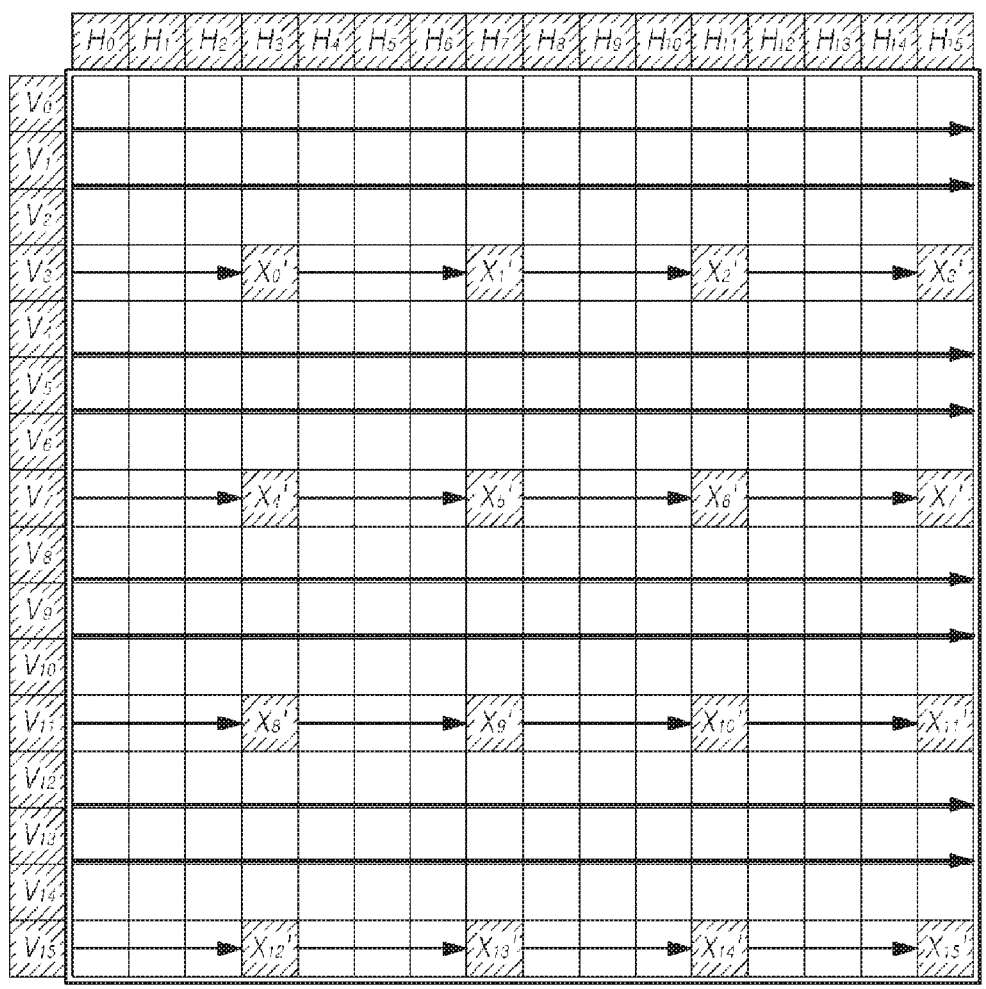

Referring to FIG. 13, at the horizontal prediction direction, in a similar way to the vertical direction, the remaining pixels located at coordinates (0, 0)~(15, 0), (0, 1)~(15, 1), and (0, 2)~(15, 2) are predicted to be the pixel $V_0$, $V_1$, and $V_2$ values, but among the pixels at coordinates (0, 3)~(15, 3) traversing the reconstructed arbitrary pixels $X_0'$, $X_1'$, $X_2'$, and $X_3'$, those pixels within coordinates (0, 3)~(2, 3) are to be predicted as the pixel $V_3$ value while pixels within coordinates (4, 3)~(6, 3) are to be predicted as $X_0'$, pixels within coordinates (8, 3)~(10, 3) are to be predicted as $X_1'$, and pixels within coordinates (12, 3)~(14, 3) are to be predicted as $X_2'$.

Figure 14:
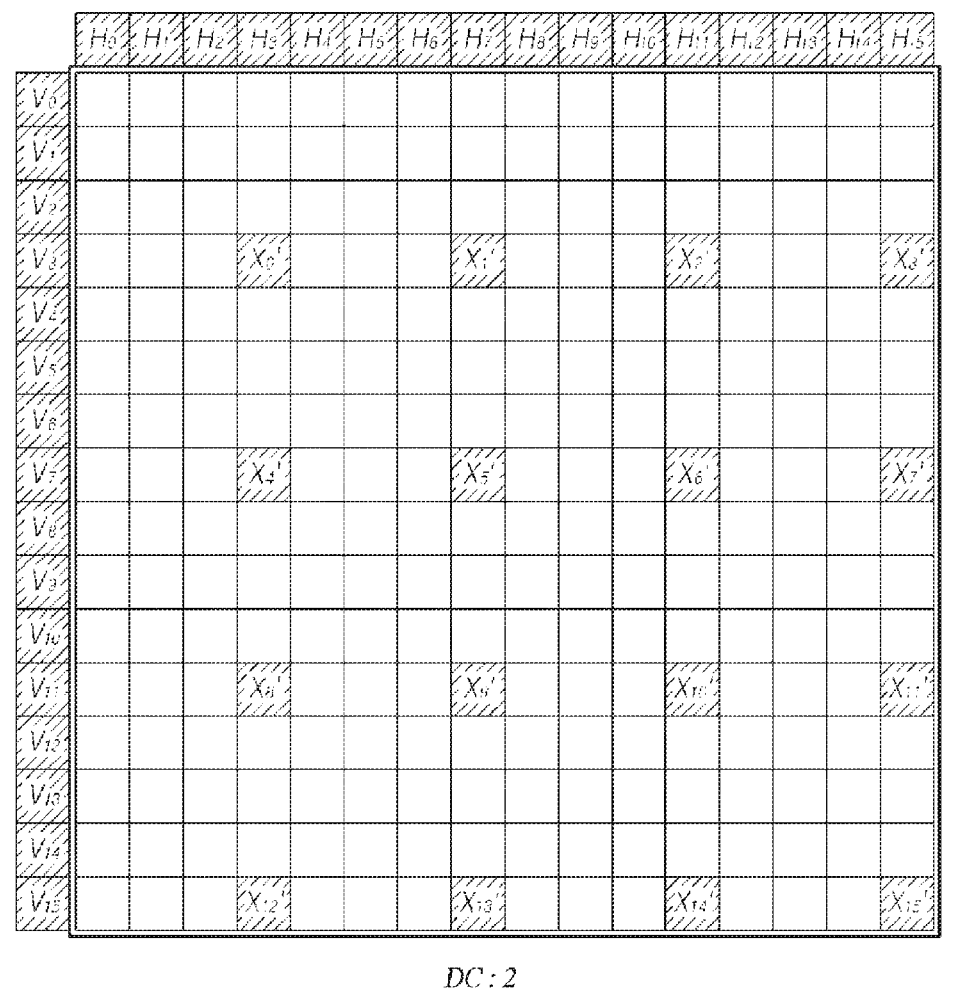

Referring to FIG. 14, at a prediction direction of the DC average prediction, the adjacent pixels $V_i(V_0 \sim V_{15})$ inside the macroblock facing the left side of the current macroblock, the adjacent pixels $H_i(H_0 \sim H_{15})$ in its top macroblock, and the respective reconstructed arbitrary pixels $X_i'$ of each sub-block are weighted with an arbitrary value before performing the predictions by calculating the average.

Figure 15:
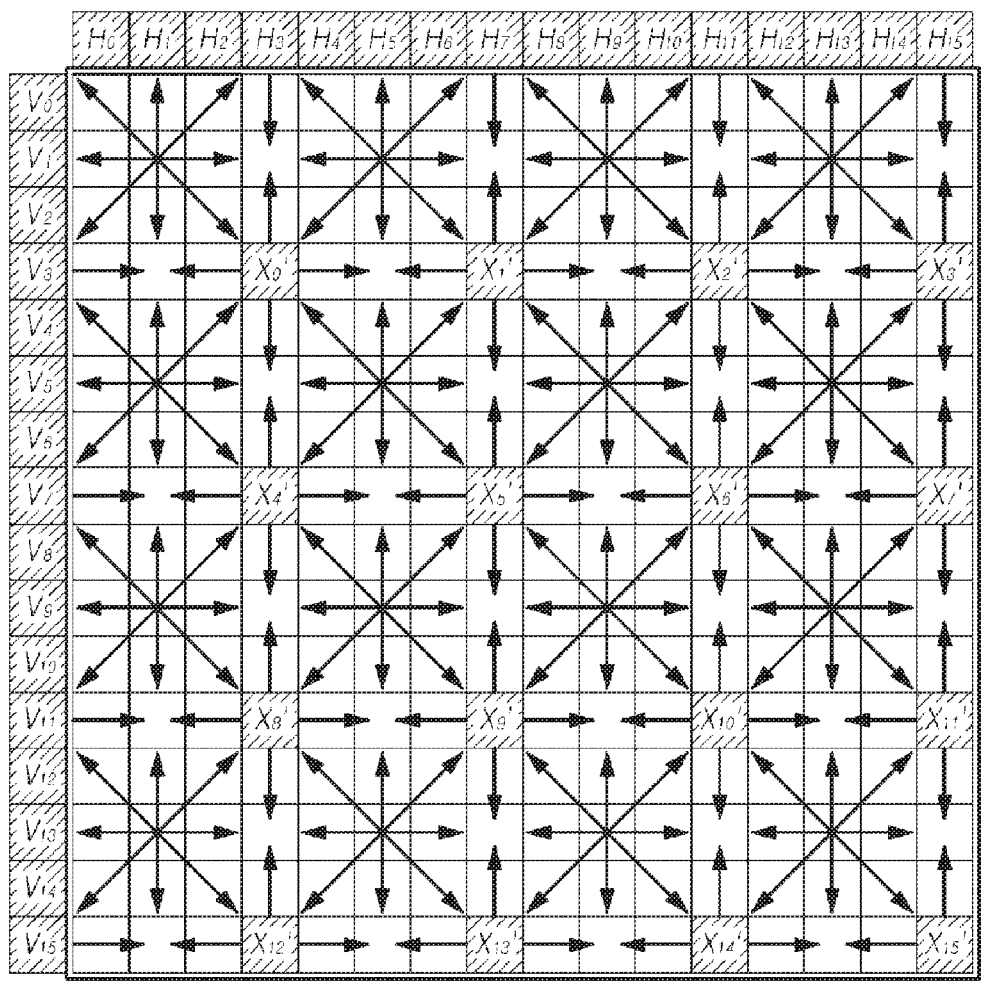

Referring to FIG. 15, at the plain prediction direction, those pixels at coordinates (3, 0)~(3, 2) are predicted by the pixel value $H_3$ and the value $X_0'$ weighted with an arbitrary value according to its distance, and the pixels at coordinates (0, 3)~(2, 3) are predicted by the pixel value $V_3$ and the value $X_0'$ weighted with an arbitrary value according to its distance, and then arbitrary weighting values are applied to the predicted pixels at coordinates (3, 0)~(3, 2) and (0, 3)~(2, 3), the reconstructed arbitrary pixel $X_0'$, and the adjacent pixels $V_0 \sim V_3$ and $H_0 \sim H_3$, thereby predicting the pixels at coordinates (0, 0)~(2, 2). Other sub-blocks are predicted in a similar way.

Second subtractor 720 subtracts the predicted blocks from the current macroblock of the actual video to generate residual macroblocks. In other words, second subtractor 720 calculates the residual signals of the remaining pixels other than the arbitrarily positioned pixel $X_i$ of each sub-block in the current macroblock, thereby generating a residual macroblock having the residual signals.

Combiner 722 combines each of inverse transformed arbitrary residual pixels in the inverse transformed arbitrary pixel residual block to the corresponding positions of the residual macroblocks. In other words, combiner 722 combines each of inverse transformed and reconstructed arbitrary residual pixels $Xd_i'$ in the inverse transformed arbitrary pixel residual block from inverse transformer 714 to the corresponding pixel positions of each corresponding sub-block in the residual macroblocks from second subtractor 720. Therefore, the residual macroblocks generated at second subtractor 720 carried only the residual signals of the remaining pixels, but upon having the reconstructed arbitrary residual pixels combined by combiner 722, it becomes a wholesome residual macroblock. As such, by combining the previously reconstructed arbitrary residual signals $Xd_i'$ to the positions of the arbitrary residual pixels in each residual sub-block, possible quantization errors associated with the transform and quantization can be mitigated. In other words, because the reconstructed arbitrary residual pixels already carry the quantization errors reflected in them, both the video encoding and decoding apparatuses will be able to operate with respect to the reconstructed arbitrary residual signals $Xd_i'$ with no discrepancies regardless of the quantization errors. Therefore, the encoding and decoding processes take only the quantization errors in the remaining pixels into account and this mitigates the quantization errors better than using the arbitrary residual signals $Xd_i'$ with no quantization errors reflected in them.

Second transformer 724 transforms the residual macroblocks having the inverse transformed arbitrary residual pixels combined. Second transformer 724 transforms the respective residual signals of the residual macroblocks having the inverse transformed arbitrary residual pixels combined by combiner 722 into the frequency domain, thereby generating residual macroblocks having frequency coefficients.

In addition, second transformer 724 transforms the residual macroblock by unit of 4×4 block using DCT transform while it uses basic vectors determined according to the sequence of a first one-dimensional transform direction. Here, the sequence of the first one-dimensional transform direction is decided according to a prediction direction of the first predictor 704.

FIG. 16 is an exemplary diagram showing a one-dimensional transform in preparation for a two-dimensional DCT transform. Referring to FIG. 16, second transformer 724 gets the two-dimensional DCT transform done by performing a horizontal one-dimensional transform first and then a vertical one-dimensional transform or vice versa where the sequence of first performing the one-dimensional transform in the horizontal or vertical direction is decided by the direction of prediction on the arbitrary pixel block in first predictor 704.

Depending on such decided sequence of the first one-dimensional transform, second transformer 724 applies the different basic vectors for use in the one-dimensional transform. FIGS. 17 and 18 show an inverse transform procedure using the modified basic vectors according to the sequential directions of the inverse transform. When applying a horizontal one-dimensional transform first and then a vertical one-dimensional transform, as shown in FIG. 17, second transformer 724 performs the horizontal one-dimensional transform with respect to respective 4×4 blocks using an existing basic vector in their first to third rows and a modified basic vector in their fourth rows, and perform the vertical one-dimensional transform with respect to the respective 4×4 blocks using the modified basic vector in their first columns and the modified basic vector in their second to fourth columns.

Additionally, when applying a vertical one-dimensional transform first and then a horizontal one-dimensional transform, as shown in FIG. 18, second transformer 724 performs the vertical one-dimensional transform with respect to respective 4×4 blocks using an existing basic vector in their first to third columns and a modified basic vector in their fourth columns, and perform the horizontal one-dimensional transform with respect to the respective 4×4 blocks using the modified basic vector in their first rows and the modified basic vector in their second to fourth rows.

As above, determining the sequence of the first one-dimensional transform direction according to the prediction direction and accordingly taking either the existing basic vector or the modified basic vector for the known basic vectors used in transforms will not only reduce high-frequency components in the pixel signals but can have the residual signals for the remaining pixels in the respective sub-blocks transformed independently of the respective arbitrary pixel residual signals. Here, the existing basic vectors and the modified basic vectors are same as those described referring to FIG. 10.

Second quantizer 726 performs a quantization with respect to the transformed residual macroblocks. Second quantizer 726 performs the quantization with respect to the frequency coefficients of the transformed residual macroblocks from second transformer 724 to generate the quantized residual macroblocks, which are the residual macroblocks having the quantized frequency coefficients.

Encoder 728 encodes a quantized residual macroblocks to generate a bitstream. Specifically, encoder 728 generates the quantized frequency coefficient sequence by performing scanning such as zig-zag scanning or others with respective to the quantized frequency coefficients of the quantized residual macroblocks and outputs the bitstream by encoding the generated quantized frequency coefficient sequence by using various encoding techniques including an entropy encoding. At this time, encoder 728 encodes not only the quantized residual macroblocks but also information on the prediction modes delivered from first predictor 704 or second predictor 718.

Second inverse quantizer 730 performs an inverse quantization with respect to the quantized residual macroblocks. Second inverse quantizer 730 performs the inverse quantization with respect to the quantized frequency coefficients of the quantized residual macroblocks from second quantizer 726 to generate the inverse quantized residual macroblocks having the resulting frequency coefficients.

Second inverse transformer 732 performs an inverse transform with respect to the inverse quantized residual macroblocks. Second inverse transformer 732 performs the inverse transform with respect to such frequency coefficients of the inverse quantized residual block from second inverse quantizer 730 into the spatial domain and then reconstructs the arbitrary pixel residual signals in order to generate a reconstructed arbitrary pixel residual block.

Second inverse transformer 732 inverse-transforms the inverse quantized residual macroblock by unit of 4×4 block using an inverse DCT transform while it uses basic vectors determined according to the sequence of a first one-dimensional inverse transform direction in the inverse DCT transform. In addition, second inverse transformer 732 decides the sequence of the first one-dimensional inverse transform direction as being the reverse of the sequence of the first one-dimensional transform direction at second transformer 724.

In other words, second inverse transformer 732, when applying a horizontal one-dimensional inverse transform first and then a vertical one-dimensional inverse transform, as shown in FIG. 17, performs the horizontal one-dimensional inverse transform with respect to respective 4×4 blocks using a modified basic vector in their first rows and an existing basic vector in their second to fourth rows, and performs the vertical one-dimensional inverse transform with respect to the respective 4×4 blocks using the existing basic vector in their first to third columns and the modified basic vector in their fourth columns.

Additionally, second inverse transformer 732, when applying a vertical one-dimensional inverse transform first and then a horizontal one-dimensional inverse transform, as shown in FIG. 18, performs the vertical one-dimensional inverse transform with respect to respective 4×4 blocks using a modified basic vector in their first columns and an existing basic vector in their second to fourth columns, and performs the horizontal one-dimensional inverse transform with respect to the respective 4×4 blocks using the existing basic vector in their first to third rows and the modified basic vector in their fourth rows.

Second adder 734 is designed to add the inverse transformed residual block to the predicted macroblock to generate a reconstructed current block. Specifically, second adder 734 adds the respective residual signals of the inverse transformed residual macroblocks from second transformer 734 to the respective pixels of the predicted block from second predictor 718 to generate a reconstructed current macroblocks, which are the macroblocks having the reconstructed pixels.

Combiner 736 is designed to combine the respective reconstructed arbitrary pixels in the reconstructed arbitrary pixel block to the corresponding positions of the reconstructed current macroblock. Specifically, combiner 736 combines the respective reconstructed arbitrary pixels in the reconstructed arbitrary pixel block from first adder 716 to the corresponding positions of the reconstructed current macroblock from second adder 734 to generate the finally reconstructed current macroblocks. Such finally reconstructed current macroblocks are stored in a memory (not shown) for being used by first predictor 704 and second predictor 718 in encoding the next macroblock.

Figure 19:
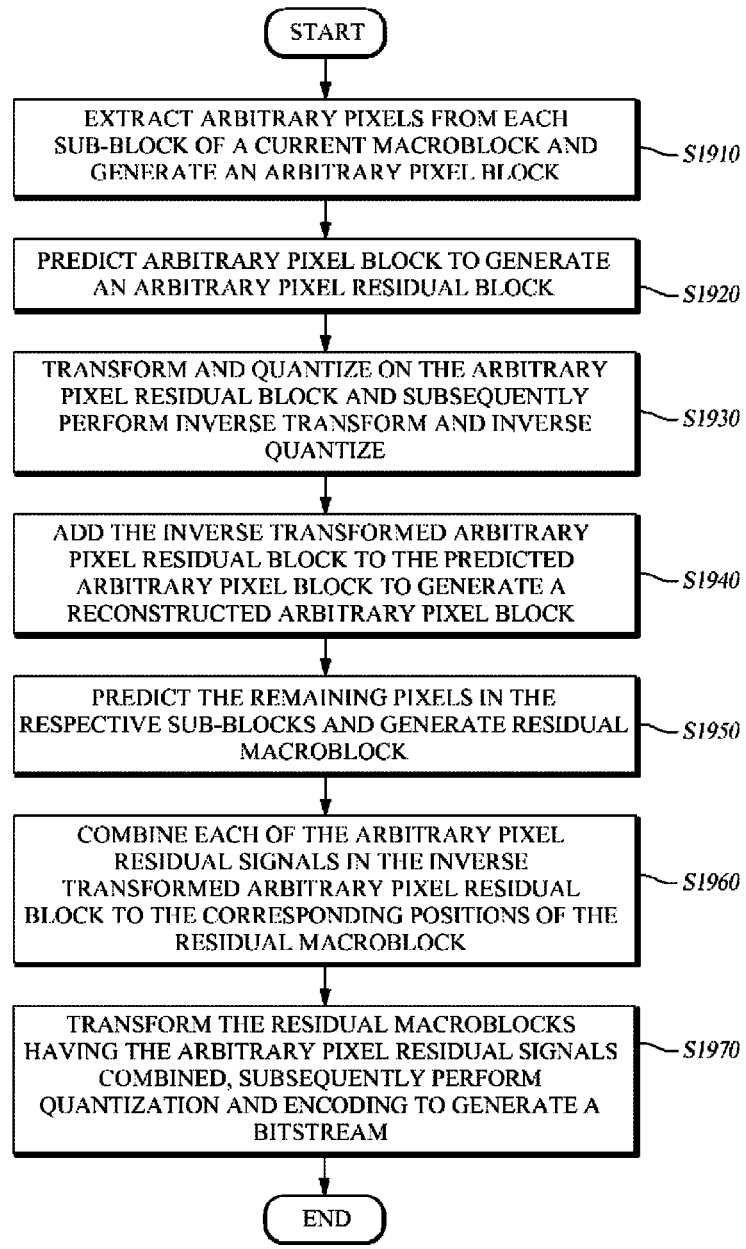
FIG. 19 is a flow diagram of a video encoding method according to an embodiment.

FIG. 19 is a flow diagram for illustrating a video encoding method according to an embodiment.

Upon receiving a video to encode, video encoding apparatus 700 divides the video by unit of macroblock and elects from various block modes the optimal block mode, in which the apparatus 700 predicts the macroblock to currently encode and then completes the encoding.

If the intra mode is the encoding mode of choice to perform the intra prediction, video encoding apparatus 700 extracts arbitrary pixels from each sub-block of a current macroblock and generates an arbitrary pixel block at step S1910, predicts the arbitrary pixel block and generates a predicted arbitrary pixel block, and subtracts the predicted arbitrary pixel block from the arbitrary pixel block to generate an arbitrary pixel residual block at S1920.

Video encoding apparatus 700 is configured to perform a transform on the arbitrary pixel residual block, a quantization with respect to the transformed arbitrary pixel residual block, an inverse quantization with respect to the quantized arbitrary pixel residual block, and an inverse transform with respect to the inverse quantized arbitrary pixel residual block at S1930, and adds the inverse transformed arbitrary pixel residual block to the predicted arbitrary pixel block to generate a reconstructed arbitrary pixel block at S1940. Video encoding apparatus 700 predicts the remaining pixels in the respective sub-blocks by using adjacent pixels to the current macroblock and each of reconstructed arbitrary pixels in the reconstructed arbitrary pixel block to generate predicted macroblocks, and subtracts the predicted macroblocks from the current macroblock to generate residual macroblocks at S1950.

In addition, video encoding apparatus 700 is designed to combine each of inverse transformed arbitrary residual pixels in the inverse transformed arbitrary pixel residual block to the corresponding positions of the residual macroblock at S1960, transforms the residual macroblocks having the respective inverse transformed arbitrary residual pixels combined, perform quantization with respect to the transformed residual macroblocks, and encodes the quantized residual macroblocks to generate a bitstream at S1970.

Figure 20:
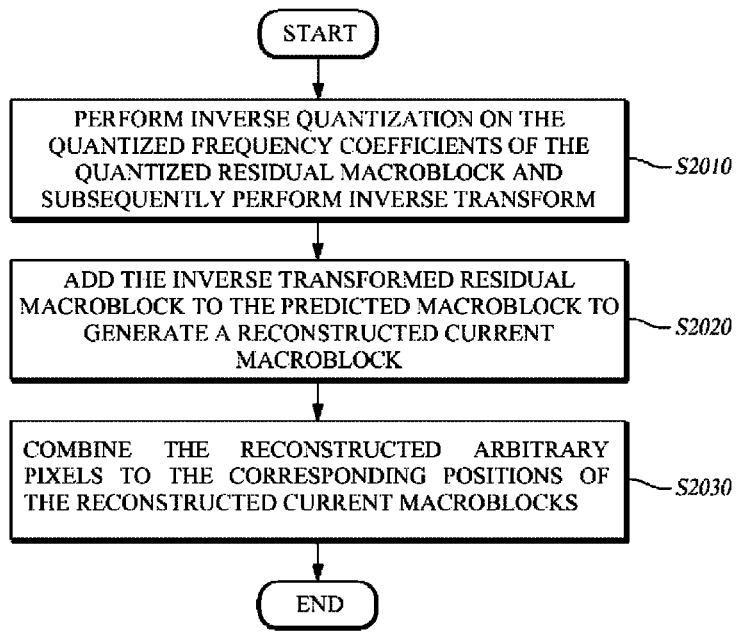
FIG. 20 is a flow diagram of the procedure of reconstructing a current macroblock according to an embodiment.

Thereafter, as shown in FIG. 20, video encoding apparatus 700 reconstructs the current macroblock. In particular, video encoding apparatus 700 performs an inverse quantization with respect to the quantized residual macroblock at S1960 and perform an inverse transform with respect to the inverse quantized residual block at S2010, adds the inverse transformed residual macroblock to the predicted macroblock to generate a reconstructed current macroblock at S2020, and combines the respective reconstructed arbitrary pixels in the reconstructed arbitrary pixel block to the corresponding positions of the reconstructed current macroblocks to generate the finally reconstructed current macroblocks at S2030.

As described above, the bitstream of video encoded by video encoding apparatus 700 is then transmitted in real time or non-real-time to video decoding apparatuses described below for decoding the same before its reconstruction and reproduction into the video via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 21:
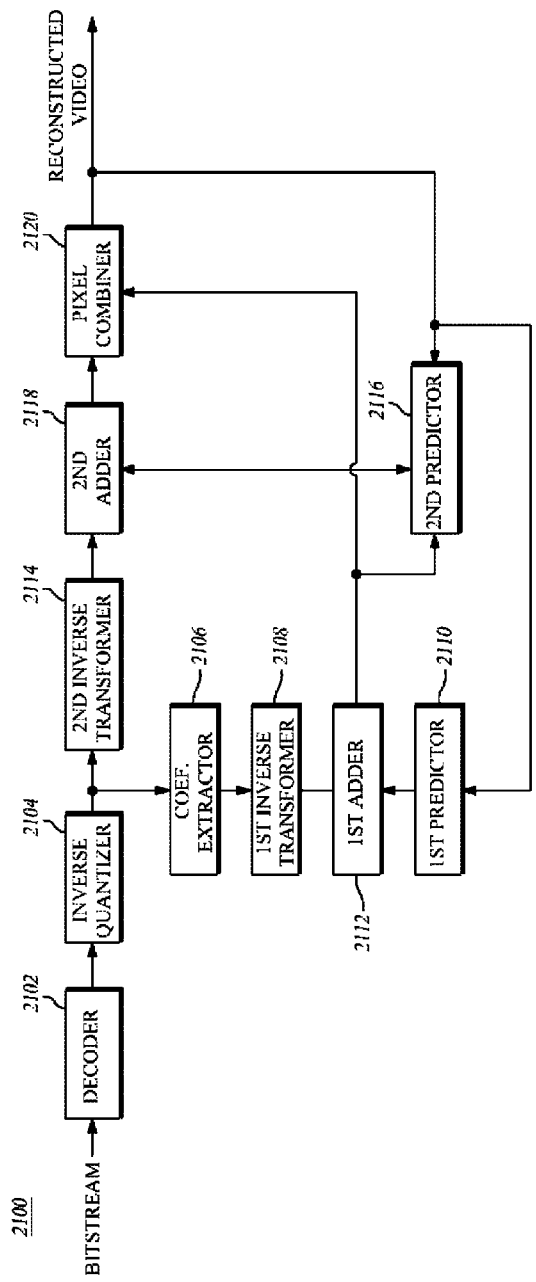
FIG. 21 is a block diagram of a video decoding apparatus according to at least one embodiment of the present disclosure.

FIG. 21 is a block diagram of a video decoding apparatus 2100 according to an embodiment.

Video decoding apparatus 2100 for decoding a video comprises a decoder 2102, an inverse quantizer 2104, an extractor 2106 for extracting frequency coefficients, a first inverse transformer 2108, a first predictor 2110, a first adder 2112, a second inverse transformer 2114, a second predictor 2116, a second adder 2118, and a pixel combiner 2120. Other components of the video decoding apparatus 2100, such as the decoder 2102, the inverse quantizer 2104, the extractor 2106, the first inverse transformer 2108, the first predictor 2110, the first adder 2112, the second inverse transformer 2114, the second predictor 2116, the second adder 2118, and the pixel combiner 2120 comprise one or more processors and/or application-specific integrated circuits (ASICs) specified for respectively corresponding operation and functions described herein after. The video decoding apparatus 2100 further comprises input units (not shown in FIG. 21) such as one or more buttons, a touch screen, a mic and so on, and output units (not shown in FIG. 21) such as a display, an indicator and so on. The video decoding apparatus 2100 further comprises communication modem(s) to receive and/or communication signals to thereby communicate with the video encoding apparatus 100 through wire or wireless networks (herein, the wire or wireless networks include, for example, one or more network interfaces including, but not limited to, cellular, Wi-Fi, LAN, WAN, CDMA, WCDMA, GSM, LTE and EPC networks, and cloud computing networks).

Decoder 2102 is designed to decode a bitstream and extracts residual macroblocks and prediction modes. Specifically, decoder 2101 decodes the bitstream to extract the quantized frequency coefficient sequence and the prediction modes, and performs various inverse scanning including an inverse zig-zag scanning with respect to the quantized frequency coefficient sequence to generate the residual macroblocks.

Inverse quantizer 2104 performs an inverse quantization with respect to the residual macroblocks, and extractor 2106 extracts the frequency coefficients corresponding to positions of arbitrary pixels of each sub-block from the inverse quantized residual macroblocks. Here, the frequency coefficients corresponding to positions of arbitrary pixels are the DC component frequency coefficients.

First inverse transformer 2108 performs an inverse transform with respect to the extracted frequency coefficients from extractor 2106 to generate an inverse transformed arbitrary pixel residual block. First inverse transformer 2108 operates on the extracted frequency coefficients in the similar or same way the first inverse transformer 714 performs the inverse transform as described with reference to FIG. 7 and the detailed descriptions of the same is omitted.

First predictor 2110 predicts an arbitrary pixel block in a prediction direction according to the extracted prediction mode from decoder 2102 to generate a predicted arbitrary pixel block. First predictor 2110 operates on the arbitrary pixel block in the prediction direction in the similar or same way the first predictor 704 performs the prediction as described with reference to FIG. 7 and the detailed descriptions of the same is omitted. First adder 2112 adds the inverse transformed arbitrary pixel residual block to the predicted arbitrary pixel block to generate a reconstructed arbitrary pixel block.

Second inverse transformer 2114 performs an inverse transform with respect to the inverse quantized residual macroblock to generate an inverse transformed residual macroblock. Second inverse transformer 2114 operates on the frequency coefficients of the inverse quantized residual macroblocks in the similar or same way the second transformer 724 performs the inverse transform as described with reference to FIG. 7 and the detailed descriptions of the same is omitted.

Second predictor 2116 predicts a current macroblock of the video in a prediction direction according to the prediction mode by using adjacent pixels to the current macroblock and each of the reconstructed arbitrary pixels in the reconstructed arbitrary pixel block to generate a predicted current macroblock. This operation of second predictor 2116 predicting the current macroblock of the video in a prediction direction according to the prediction mode by using adjacent pixels to the current macroblock and each of the reconstructed arbitrary pixels in the reconstructed arbitrary pixel block is similar to or same as the second predictor 718 performs the prediction as described with reference to FIG. 7 and the detailed descriptions of the same is omitted.

Second adder 2118 generates a reconstructed current macroblock by using the inverse transformed residual macroblock and the predicted current macroblock. Combiner 2120 combines the respective reconstructed arbitrary pixels to the corresponding positions of the reconstructed current macroblock. As such, the combined current macroblock becomes the finally reconstructed current macroblock, and such finally reconstructed current macroblocks grouped by units of picture are outputted as a reconstructed video. In addition, the finally reconstructed macroblock is employed by first predictor 2110 and second predictor 2116 to encode the next macroblock.

Figure 22:
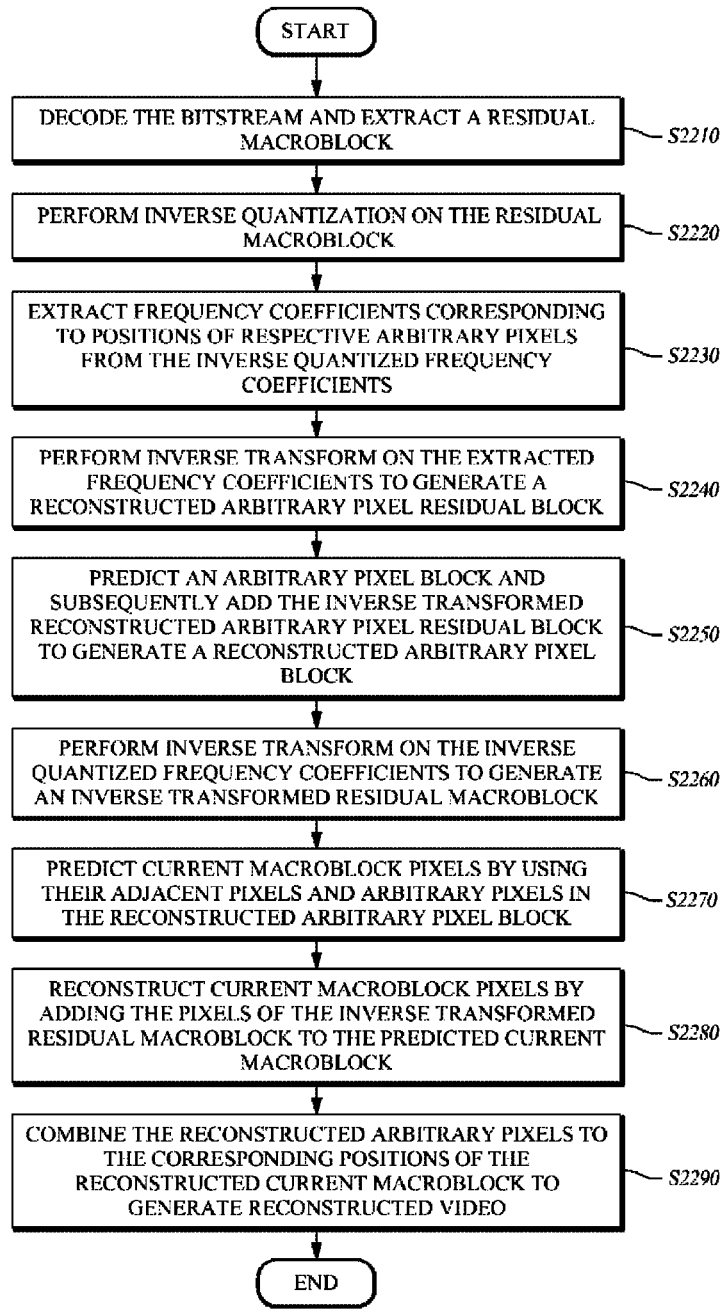
FIG. 22 is a flow diagram of a video decoding method according to at least one embodiment of the present disclosure.

FIG. 22 is a flow diagram of a video decoding method according to an embodiment of the present disclosure.

Video decoding apparatus 2100, that has received and stored the bitstream for a video via a wired/wireless communication network or cable, decodes and reconstructs the video in order to reproduce it according to a user selected algorithm or another algorithm of a program in execution.

In order to achieve this, video decoding apparatus 2100 decodes the bitstream and extract a residual macroblock and a prediction mode at step S2210, and perform inverse quantization with respect to the residual macroblock at S2220.

Video decoding apparatus 2100 extracts frequency coefficients corresponding to positions of arbitrary pixels in each sub-block from the inverse quantized residual macroblock at S2230, performs inverse transform with respect to the extracted frequency coefficients to generate a reconstructed arbitrary pixel residual block at S2240, and predicts an arbitrary pixel block in a prediction direction according to the prediction mode to generate a predicted arbitrary pixel block at S2250. Furthermore, video decoding apparatus 2100 adds the inverse transformed reconstructed arbitrary pixel residual block from S2240 to the predicted arbitrary pixel block from S2250 to generate a reconstructed arbitrary pixel block at S2250.

Video decoding apparatus 2100 performs an inverse transform with respect to the inverse quantized residual macroblock to generate an inverse transformed residual macroblock at S2260, and predicts a current macroblock of the video in a prediction direction according to the prediction mode by using adjacent pixels to the current macroblock and each of reconstructed arbitrary pixels in the reconstructed arbitrary pixel block to generate a predicted current macroblock at S2270. Video decoding apparatus 2100 generates a reconstructed current macroblock by using the inverse transformed residual macroblock and the predicted current macroblock at S2280, and combines the respective reconstructed arbitrary pixels to the corresponding positions of the reconstructed current macroblock at S2290.

In the following, a video encoding apparatus according to another embodiment will be described. The present embodiment of the video encoding apparatus is same as the first embodiment of the video encoding apparatus by their components, although the component functions are distinctive.

Specifically, in encoding and decoding each sub-block of the current macroblock to be currently encoded, the first embodiment of the video encoding apparatus 700 encodes the entire sub-blocks and then decodes them to perform the transforms and quantizations by unit of current macroblock. Whereas, this embodiment of the video encoding apparatus, in encoding and decoding the entire sub-blocks, processes one sub-block of both encoding and decoding after processing another sub-block of encoding and decoding to go through the entire sub-blocks. Therefore, in this embodiment, the transforms and quantizations are performed by unit of sub-block.

Figure 23:
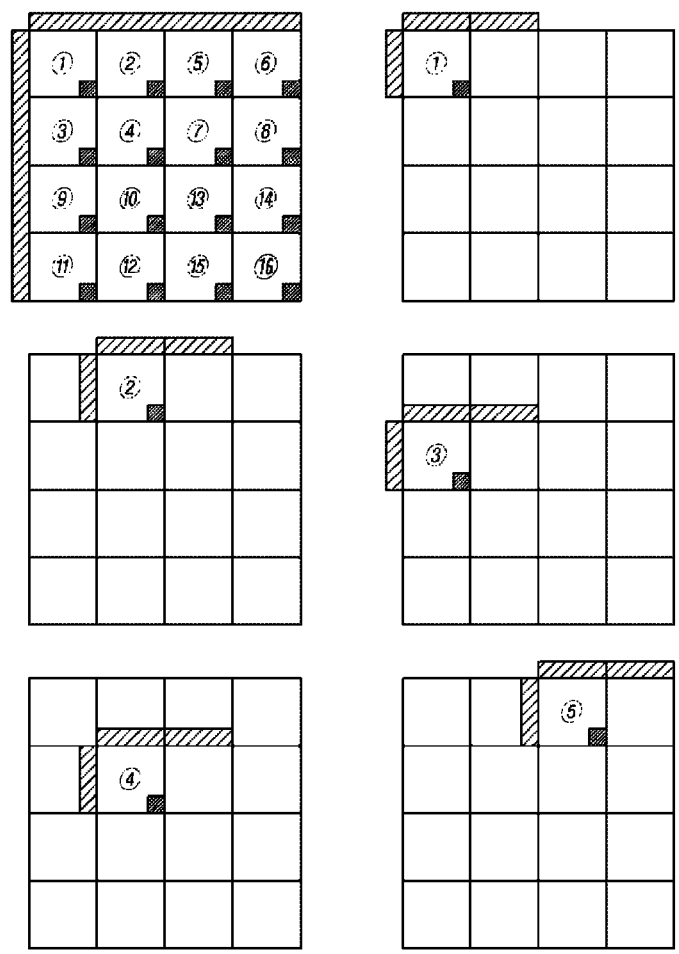
FIG. 23 is an exemplary diagram of the sequence of encoding the respective sub-blocks according to at least one embodiment of the present disclosure.

Referring to FIG. 23, the first embodiment of the video encoding apparatus 700 completes the encoding of the respective sub-blocks of the current macroblock in the numbered sequence as shown and thereafter decodes the respective sub-blocks. In particular, the first embodiment of the video encoding apparatus 700 sequentially predicts the sub-blocks numbered 1 to 16 with succeeding subtractions by using adjacent pixels to the current macroblock and the reconstructed arbitrary pixels in the respective sub-blocks for being subjected to transforms and quantizations by unit of macroblock until the entire sub-blocks are thus encoded, and then continues to perform an inverse quantization and inverse transform on the quantized macroblock and then subtract the respective predicted sub-blocks from the transformed residual macroblock to eventually decode the sub-blocks at 1 to 16.

In contrast, this embodiment of the video encoding apparatus comprise second predictor 178 for predicting the sub-block 1 by using its adjacent pixels and the reconstructed arbitrary pixels, second subtractor 720 for generating the residual sub-block for the sub-block 1, second transformer 724 for transforming the residual sub-block, second quantizer 726 for performing quantization with respect to the transformed residual sub-block, second inverse quantizer 730 for performing an inverse quantization with respect to the respective quantized residual sub-blocks, and second inverse transformer 732 for performing inverse transform with respect to the inverse quantized residual sub-blocks and adding with the predicted sub-block to generate a reconstructed sub-block 1. Thereafter, second predictor 178 predicts the sub-block 2 by using not just the adjacent pixels to the current macroblock but the pixels located in the reconstructed sub-block 1 close to the sub-block 2 as the left-side adjacent pixels and the adjacent pixels to the current macroblock as the upper-side adjacent pixels, and in particular these adjacent pixels and the reconstructed arbitrary pixels within the sub-block 2 are used to predict the sub-block 2. Subtracting the predicted sub-block 2 from the sub-block 2 generates a residual sub-block, which is then subjected to a transform, quantization, inverse transform and inverse quantization to reconstruct the sub-block 2. These steps are repeatedly carried out in sequence to encode the respective sub-blocks while using the respective sub-blocks reconstructed.

This embodiment of the video encoding apparatus extracts arbitrary pixels from each sub-block of the current macroblock of the video to generate an arbitrary pixel block, predicts the arbitrary pixel block to generate a predicted arbitrary pixel block, subtracts the predicted arbitrary pixel block from the arbitrary pixel block to generate an arbitrary pixel residual block, transforms the arbitrary pixel residual block and perform quantization with respect to the transformed arbitrary pixel residual block, performs an inverse quantization with respect to the quantized arbitrary pixel residual block and performs an inverse transform with respect to the inverse quantized arbitrary pixel residual block, and then adds the inverse transformed arbitrary pixel residual block to the predicted arbitrary pixel block to generate a reconstructed arbitrary pixel block. The apparatus continues to predict the remaining pixels in the respective sub-blocks by using adjacent pixels to the respective sub-blocks and the respective reconstructed arbitrary pixels in the reconstructed arbitrary pixel block to generate the respective predicted blocks, subtract the respective predicted sub-blocks from the sub-blocks to generate the respective residual sub-blocks, combine each of inverse transformed arbitrary residual pixels in the inverse transformed arbitrary pixel residual block to the corresponding positions of the respective residual sub-blocks, transform the respective residual sub-blocks having the respective inverse transformed arbitrary residual pixels combined and perform quantization with respect to the respective transformed residual sub-blocks, and then encode the respective quantized residual sub-blocks to generate a bitstream. Throughout the respective sub-blocks, one sub-block is encoded and subsequently decoded after the encoding and decoding on another sub-block.

This embodiment of the video encoding apparatus also performs an inverse quantization with respect to the respective quantized residual sub-blocks, performs an inverse transform with respect to the respective inverse quantized residual sub-blocks and adds the respective inverse transformed residual sub-blocks to the respective predicted sub-blocks to generate the respective reconstructed sub-blocks, and then combines the respective reconstructed arbitrary pixels in the reconstructed arbitrary pixel block to the corresponding positions of the respective reconstructed sub-blocks. In predicting the remaining pixels of the respective sub-blocks, the respective sub-blocks having the respective reconstructed arbitrary pixels combined are stored for use in predicting the subsequent sub-blocks.

In addition, this embodiment of the video encoding apparatus does not use the prediction direction of the current macroblock or the prediction direction of first predictor 704 but rather decide a prediction direction for the respective sub-blocks and predict the remaining pixels of the respective sub-blocks in the decided prediction directions. To this end, this embodiment of the video encoding apparatus includes second predictor 718 for use in deciding as the prediction directions the directions of the adjacent pixels to the respective sub-blocks facing toward the respective reconstructed arbitrary pixels with the least difference in value therebetween. Optionally, this second predictor 718 generates information on the prediction mode according to the prediction directions of the respective sub-blocks for supplying to encoder 728. Upon receiving the prediction mode information of the respective sub-blocks delivered, encoder 728 encodes the respective sub-block prediction mode information to inset the same in the bitstream so that the video decoding apparatus in predicting the respective sub-blocks uses such information to synchronize the prediction directions. If there is no sub-block prediction mode information encoded, the video decoding apparatus operates similar to the encoding apparatus in deciding the prediction directions of the respective sub-blocks and making predictions in the decided directions.

Figure 24:
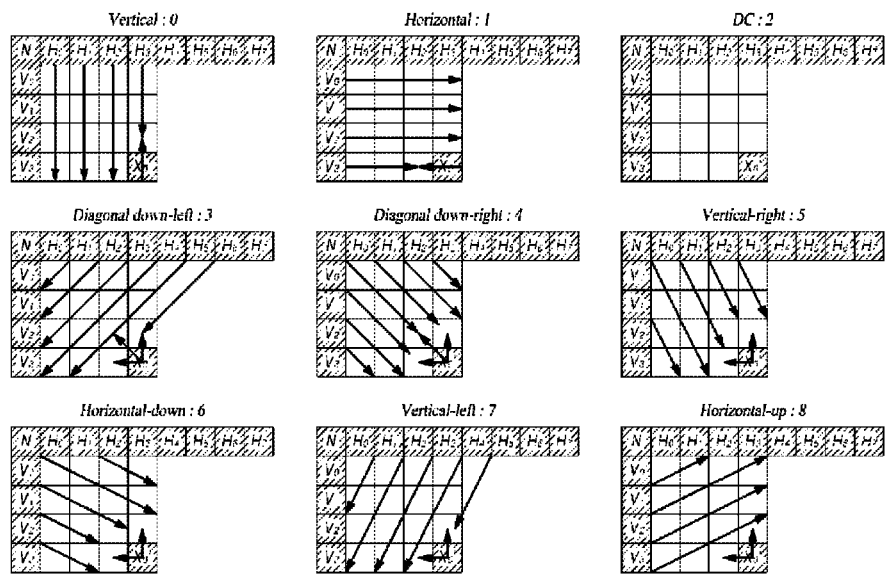
FIG. 24 is an exemplary diagram of decisions of prediction directions of the respective sub-blocks according to at least one embodiment of the present disclosure.

Referring to FIG. 24, second predictor 718 in this embodiment does not rely on the prediction directions of first predictor 704 but decides the respective new optimal prediction directions by comparing the previously reconstructed pixels at the left $V_i$ and the top $H_i$ of the sub-blocks against the reconstructed arbitrary pixels $X_i'$, and predicts the respective sub-blocks in the newly decided optimal prediction directions. Newly capturing the optimal predetermined directions is through predicting edges by using the arbitrary pixels $X_i$ and adjacent pixels $V_0 \sim V_3$, $H_0 \sim H_7$ adjacent to the current macroblock.

For example, if $X_i$ and $H_3$ have the strongest resemblance, the optimal prediction direction of the corresponding sub-block is set to be vertical, and if $X_i$ and $V_3$ have the strongest resemblance, the optimal prediction direction of the corresponding sub-block is set to be horizontal. DC prediction mode is decided when the values $V_0 \sim V_3$, $H_0 \sim H_7$ resemble to $X_i$. Diagonal-left is decided when there are resemblances between $V_0$ and $H_0$, $V_1$ and $H_1$, $V_2$ and $H_2$, $V_3$ and $H_3$, and/or $H_7$ and $X_i$. Diagonal-right is decided when there are resemblances between N and $X_i$. Vertical-right is decided when there are resemblances between $H_1$ and $X_i$. Horizontal-down is decided when there are resemblances between $V_2$ and $X_i$. Vertical-left is decided when there are resemblances between $H_5$ and $X_i$ and when $H_0$ and $V_1$, $H_1$ and $V_2$, and/or $H_2$ and $V_3$ have resemblances. Horizontal-up is decided when there are resemblances between $H_1$ and $V_0$, $H_2$ and $V_1$, $H_3$ and $V_2$, and/or $H_4$ and $V_3$. In this way, second predictor 718 in this embodiment decides the optimal directions for the respective sub-blocks before predictions in order to increase the prediction accuracy. In other words, for the respective sub-blocks, predictions are performed on the remaining pixels by using the reconstructed arbitrary pixels and therefore in accordance with the relations between the reconstructed arbitrary pixels and their adjacent pixels the respective sub-blocks have the respectively decided optimal prediction directions therefor, whereby such changes of prediction directions will improve the efficiency of compressing videos through the encoding and decoding.

Figure 25:
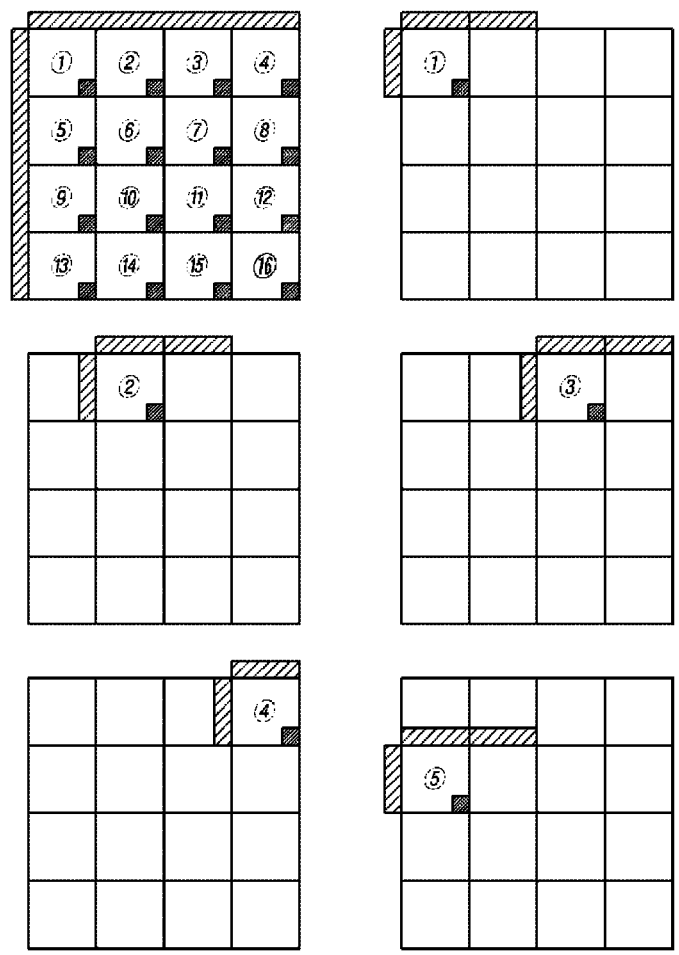
FIG. 25 is an exemplary diagram of the sequences of encoding and decoding of the respective sub-blocks according to the direction of raster scanning.

Here, the sequence of encoding and decoding of the respective sub-blocks by this embodiment of the video encoding apparatus is either the sequence of encoding and decoding of intra_4x4 blocks in H.264/AVC or a raster scanning direction. The sequence in FIG. 23 depicts the encoding and decoding sequence on intra_4x4 blocks in H.264/AVC standard, whereas FIG. 25 depicts the encoding and decoding sequence on the respective sub-blocks according to the raster scanning direction. As shown, this embodiment of the video encoding apparatus is subject a sub-block to the prediction, transform, quantization, inverse quantization, and inverse transform in an arbitrary sequence to reconstruct it, and then uses the previously reconstructed sub-blocks to process the subsequent sub-blocks through the prediction, transform, quantization, inverse quantization, and inverse transform as a way to encode and decode the respective sub-blocks.

FIG. 26 illustrates the process of predicting the remaining pixels according to newly decided optimal prediction directions by using the reconstructed arbitrary pixels X and adjacent pixels H, V, N. In this embodiment, predictions are made with respective to the remaining pixels of the respective sub-blocks in the illustrated method.

In addition, this embodiment of the video encoding apparatus contains the rest of the features of video encoding apparatus 700. This means that first transformer 708 of the video encoding apparatus in this embodiment exclusively and independently transforms and then inversely transforms each of arbitrary pixel residual signals of the arbitrary pixel residual block, performs a DCT transform on each of arbitrary pixel residual signals of the arbitrary pixel residual block by using the modified basic vectors to exclusively and independently transform the respective arbitrary pixel residual signals and additionally perform the Hadamard transform.

First inverse transformer 714 of the video encoding apparatus in this embodiment also performs an inverse DCT transform on the frequency coefficients resulting from transforms of the respective arbitrary pixel residual signals by using the modified basic vectors to exclusively and independently inverse transform the respective arbitrary pixel residual signals, and then process the frequency coefficients from the transforms of the respective arbitrary pixel residual signals through an inverse Hadamard transform followed by an inverse DCT transform.

Second transformer 724 of the video encoding apparatus in this embodiment also processes the residual macroblock by unit of 4x4 block through a DCT transform while using basic vectors determined according to the sequence of a first one-dimensional transform direction of the DCT transform. At this time, the sequence of the first one-dimensional transform direction is determined according to the prediction direction of the first predictor. In addition, second transformer 724, when applying a horizontal one-dimensional transform first and then a vertical one-dimensional transform, performs the horizontal one-dimensional transform with respect to respective 4x4 blocks using an existing basic vector in their first to third rows and a modified basic vector in their fourth rows, and performs the vertical one-dimensional transform with respect to the respective 4x4 blocks using the modified basic vector in their first columns and the modified basic vector in their second to fourth columns, and in a reversed sequence of applying a vertical one-dimensional transform first and then a horizontal one-dimensional transform, it performs the vertical one-dimensional transform with respect to respective 4x4 blocks using an existing basic vector in their first to third columns and a modified basic vector in their fourth columns, and performs the horizontal one-dimensional transform with respect to the respective 4x4 blocks using the modified basic vector in their first rows and the modified basic vector in their second to fourth rows.

Second inverse transformer 732 of the video encoding apparatus in this embodiment also processes the frequency coefficients by unit of 4×4 block through an inverse DCT transform while using basic vectors determined according to the sequence of a first one-dimensional inverse transform direction of the inverse DCT transform and the sequence of the first one-dimensional inverse transform direction is determined to be the reverse of the sequence of the first one-dimensional transform direction. Additionally, second inverse transformer 732, when applying a horizontal one-dimensional inverse transform first and then a vertical one-dimensional inverse transform, performs the horizontal one-dimensional inverse transform with respect to respective 4×4 blocks using a modified basic vector in their first rows and an existing basic vector in their second to fourth rows, and perform the vertical one-dimensional inverse transform with respect to the respective 4×4 blocks using the existing basic vector in their first to third columns and the modified basic vector in their fourth columns, and in a reversed sequence of applying a vertical one-dimensional inverse transform first and then a horizontal one-dimensional inverse transform, it performs the vertical one-dimensional inverse transform with respect to respective 4×4 blocks using a modified basic vector in their first columns and an existing basic vector in their second to fourth columns, and perform the horizontal one-dimensional inverse transform with respect to the respective 4×4 blocks using the existing basic vector in their first to third rows and the modified basic vector in their fourth rows. Second inverse transformer 732 also processes the frequency coefficients by unit of 4×4 block through the inverse DCT transform while using existing basic vectors and use some of the frequency coefficients and some of the respective reconstructed arbitrary pixels to predict the remaining frequency coefficients.

First predictor 704 in this embodiment performs a low-pass filtering on the adjacent pixels to the current block and predict the arbitrary pixel block using down-sampled pixels, and it does the prediction in the same direction as a prediction direction according to the prediction mode of the current macroblock.

On the other hand, in both of the first embodiment of the video encoding apparatus and this embodiment of the video encoding apparatus, second inverse transformer 732 uses some of the frequency coefficients and some of the respective reconstructed arbitrary pixels to predict the remaining frequency coefficients, whereby they do not need the modified basic vectors but use the existing basic vectors in performing the inverse DCT transform while having arbitrary pixels inverse transformed independently of the remaining pixels.

In such a two-dimensional inverse transform, the DCT inverse transform basic vectors shown in FIG. 5, i.e. the existing basic vectors are used rather than the modified basic vectors from second inverse transformer 732 in operation. Upon completing the inverse transform, the quantized frequency coefficients substitute the DC frequency coefficient positions in order to be transmitted.

FIGS. 27 and 28 are exemplary diagrams showing the procedures of using partial frequency coefficients to predict the remaining frequency coefficients according to an embodiment and the alternative embodiment, respectively.

When second transformer 724 performs a horizontal one-dimensional transform first and then a vertical one-dimensional transform, second inverse transformer 732 calculates $DC_P$ through Equation 6. Equation 6 is to perform the one-dimensional inverse DCT transform by using the existing basic vector for the inverse transform as shown in FIG. 5.

FIG. 27 shows $DC_{00}$ at (1) which is the frequency coefficient transformed in first transformer 708 and the remaining frequency coefficients $AC_{01}$~$AC_{33}$ that are the frequency coefficients transformed in second transformer 724, and if the reconstructed arbitrary pixel $X_i'$ in the corresponding sub-block is same as (2), then vertical one-dimensional inverse DCT transforms are performed in their columns 1 to 3 only to obtain AC①, AC②, AC③ as in (3), and calculate with AC①, AC②, AC③, and the reconstructed arbitrary pixels $X_i'$ to give $DC_P$.

$$0.5 \times \text{Coef}①-0.6533 \times \text{Coef}②+0.5 \times \text{Coef}③-0.2706 \times \text{Coef}④ = X_i'' \quad \text{Equation 6}$$

Equation 6 rearranged for Coef① will derive Equation 7.

$$2 \times (-0.6533 \times \text{Coef}②+0.5 \times \text{Coef}③-0.2706 \times \text{Coef}④-X_i'')=\text{Coef}① \quad \text{Equation 7}$$

where Coef②, Coef③, and Coef④ respectively correspond to AC①, AC②, and AC③ in FIGS. 27 and 28, and Coef① is $DC_P$.

Thereafter, $AC_{10}$, $AC_{20}$, $AC_{30}$ and $DC_P$ are used to calculate $DC_{00}p$ as at (5). The method of calculating $DC_{00}p$ is same as calculating the above described $DC_P$. By using the calculated $DC_{00}p$ and $AC_{10}$, $AC_{20}$, $AC_{30}$, a vertical one-dimensional inverse transform is performed on the remaining column 1 as at (6). As to the remaining horizontal one-dimensional inverse transform, the DCT inverse transform basic vectors shown in FIG. 5, i.e. the existing basic vectors are used to perform the inverse transform as at (7) to output the reconstructed pixels of the corresponding sub-block as at (8). In this way, reductions in AC component frequency coefficients will be greater as compared to using the modified basic vectors as in FIG. 11. In addition, by using the existing basic vectors in possession without having to prepare the modified basic vectors, it is possible to inverse transform the arbitrary pixels independently of the remaining pixels of the sub-block or the frequency coefficients of the remaining pixels.

As described above, according to various embodiments of the present disclosure for encoding and decoding a video, an intra prediction of pixels in a block to currently encode or decode is improved in accuracy of prediction to increase the video coding efficiency. Further areas of applicability will become apparent from the description provided herein. The description and specific examples are intended for purposes of illustration only and are not intended to limit the sprit and scope of the claimed invention.

In the description above, although all of the components of the embodiments of the present disclosure have been explained as assembled or operatively connected as a unit, the present disclosure is not intended to limit itself to such embodiments. Rather, within the scope of the claimed invention, the respective components are selectively and operatively combined in any numbers. Every one of the components is also implemented by itself in hardware while the respective ones is able to be combined in part or as a whole selectively and implemented in computer program(s) or program instruction(s) having program modules for executing functions of the hardware equivalents. Codes or code segments to constitute such a program are easily deduced by a person of ordinary skill in the art. The computer program(s) is stored in non-transitory computer readable medium, which in operation realizes various embodiments of the present disclosure. Examples of the non-transitory computer readable medium, the candidates include magnetic media, such as a hard disk, a floppy disk, and a magnetic tape, optical media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory. The examples of the computer programs (or the program instructions) include not only machine language code generated by a compiler, but also high-level language code that can be executed by a computer using an interpreter, and so on. The above-described hardware devices are configured to operate as one or more software modules in order to perform the operation of the present disclosure, and vice versa.

Also, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those having ordinary skill in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, the scope of the claimed invention is not to be limited by the explicitly described above embodiments but by the claims and the equivalents thereof.

What is claimed is:

1. A method performed by a video encoding or decoding apparatus for intra-predicting a current block in a video image by dividing the current block into a plurality of subblocks, the method comprising:
    determining an intra prediction mode of the current block among a plurality of intra prediction modes, wherein:
        the determined intra prediction mode of the current block is applied to all of the subblocks in the current block and thereby intra prediction modes of respective subblocks in the current block are not included in a bitstream,
        each of the subblocks has a plurality of pixels; and
    sequentially reconstructing all of the subblocks in the current block by predicting a subblock, to be reconstructed among the subblocks in the current block, from at least one neighboring subblock which has already reconstructed among the subblocks in the current block using an intra prediction mode identical to the determined intra prediction mode of the current block,
    wherein each subblock in the current block is reconstructed by:
        predicting the subblock to be reconstructed in the current block, based on the determined intra prediction mode of the current block,
        generating a residual subblock corresponding to the subblock to be reconstructed by transforming frequency coefficients corresponding to the subblock to be reconstructed from a frequency domain into a spatial domain, and
        generating a reconstructed subblock by adding the predicted subblock to the residual subblock,
    wherein the subblock to be reconstructed in the current block is predicted using one or more neighboring pixels which are selected from pixels of the at least one neighboring subblock already reconstructed in the current block, wherein the one or more neighboring pixels are selected from the pixels of the at least one neighboring subblock using the intra prediction mode identical to the determined intra prediction mode of the current block.

2. The method of claim 1, wherein the at least one pre-reconstructed neighboring subblock is located at upper or left side of the subblock to be reconstructed.

3. The method of claim 1, wherein the plurality of intra prediction modes indicate prediction directions different from each other.

4. The method of claim 1, wherein a transform size of transforming the frequency coefficients is equal to a size of the subblock to be reconstructed.

5. A method performed by a video encoding or decoding apparatus for intra-predicting a current block in a video image by dividing the current block into a plurality of subblocks, the method comprising:
    determining an intra prediction mode of the current block among a plurality of intra prediction modes, wherein:
        the determined intra prediction mode of the current block is applied to all of the subblocks in the current block and thereby intra prediction modes of respective subblocks in the current block are not included in a bitstream,
        each of the subblocks has a plurality of pixels; and
    sequentially reconstructing all of the subblocks in the current block by predicting a subblock, to be reconstructed among the subblocks in the current block, from at least one neighboring subblock which has already reconstructed among the subblocks in the current bock using an intra prediction mode identical to the determined intra prediction mode of the current block,
    wherein each subblock in the current block is reconstructed by:
        predicting a current subblock to be reconstructed in the current block, based on the determined intra prediction mode of the current block,
        generating a residual subblock corresponding to the current subblock by transforming frequency coefficients corresponding to the current subblock from a frequency domain into a spatial domain, and
        generating a reconstructed subblock by adding the predicted subblock to the residual subblock,
    wherein one or more pixels in the reconstructed subblock are used for predicting at least one subblock to be reconstructed subsequent to the current subblock among the subblocks in the current block.

6. The method of claim 5, wherein the at least one pre-reconstructed neighboring subblock is located at upper or left side of the subblock to be reconstructed.

7. The method of claim 5, wherein the plurality of intra prediction modes indicate prediction directions different from each other.

8. The method of claim 5, wherein a transform size of transforming the frequency coefficients is equal to a size of the subblock to be reconstructed.

9. The method of claim 5, wherein the one or more pixels in the reconstructed subblock are selected from the reconstructed subblock using the intra prediction mode identical to the determined intra prediction mode of the current block.

* * * * *